(12) United States Patent
Yonezawa et al.

(10) Patent No.: US 7,985,803 B2
(45) Date of Patent: Jul. 26, 2011

(54) RESIN COMPOSITION FOR OPTICAL MATERIAL

(75) Inventors: Jun Yonezawa, Tokyo (JP); Eiko Kobayashi, Tokyo (JP); Masahito Kuramitsu, Tokyo (JP); Yuko Fukuoka, Tokyo (JP); Kimihiro Kubo, Tokyo (JP); Hiroshi Shirai, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 364 days.

(21) Appl. No.: 12/078,478

(22) Filed: Mar. 31, 2008

(65) Prior Publication Data

US 2008/0266493 A1 Oct. 30, 2008

Related U.S. Application Data

(63) Continuation-in-part of application No. PCT/JP2006/319425, filed on Sep. 29, 2006.

(30) Foreign Application Priority Data

Oct. 7, 2005 (JP) ................................ 2005-294560
Nov. 24, 2005 (JP) ................................ 2005-338105
Jul. 25, 2006 (JP) ................................ 2006-202516

(51) Int. Cl.
*C08L 33/02* (2006.01)
*C08L 33/04* (2006.01)
*C08L 33/18* (2006.01)
*C08L 33/20* (2006.01)
*C08L 35/02* (2006.01)

(52) U.S. Cl. ......... 525/221; 525/222; 525/238; 525/241

(58) Field of Classification Search .................. 525/221, 525/222, 238, 241
See application file for complete search history.

(56) References Cited

U.S. PATENT DOCUMENTS

| | | | |
|---|---|---|---|
| 6,184,957 B1 | 2/2001 | Mori et al. | |
| 7,052,747 B2 * | 5/2006 | Nishikouji et al. | 428/1.3 |
| 2002/0005925 A1 | 1/2002 | Arakawa | |
| 2003/0007764 A1 | 1/2003 | Hirota | |
| 2004/0041968 A1 | 3/2004 | Otoshi et al. | |
| 2004/0201805 A1 | 10/2004 | Nishikouji et al. | |
| 2007/0267127 A1 | 11/2007 | Otoshi et al. | |

FOREIGN PATENT DOCUMENTS

| | | |
|---|---|---|
| CN | 1508607 | 6/2004 |
| DE | 42 39 436 | 5/1994 |
| EP | 1 607 774 A1 | 6/2005 |
| JP | 56-98251 | 8/1981 |
| JP | 5-257014 | 10/1993 |
| JP | 7-35923 | 2/1995 |
| JP | 7-233296 | 9/1995 |
| JP | 10-054982 | 2/1998 |
| JP | 2002-40258 | 2/2002 |
| JP | 2002-156525 | 5/2002 |
| JP | 2002-174729 | 6/2002 |
| JP | 2004-145282 | 5/2004 |
| JP | 2004-212971 | 7/2004 |
| JP | 2005-157306 | 6/2005 |
| TW | 567344 | 12/2003 |
| WO | 02/39153 | 5/2002 |

OTHER PUBLICATIONS

International Preliminary Report of Patentability issued on Sep. 29, 2006 in corresponding International Patent Application PCT/JP2006/319425.
European Search Report dated Feb. 5, 2010 issued in corresponding European Patent Application 06810831.5.
M. Nishimoto et al., Miscibility of blends of polymers based on styrene, acrylonitrile and methyl methacrylate, vol. 30, Jul. 1989; pp. 1279-1285.
S. Takahashi et al., "Conformational Change of Phenyl Ring Side Group during Stress Relaxation in Glassy Poly(styrene-co-acrylonitrile)" Macromolecules 2004, 37; pp. 1062-1066.
D. Chopra et al., Effect of Maleic Anhydride Content on the Rheology and Phase Behavior of Poly(Styrene-co-Maleic Anhydride)/Poly(Methyl Methacrylate) Blends, Society of Plastics Engineers, Annual Technical Conference, vol. 2, 2001, pp. 2326-2330.
Reference AJ is cited in the International Search Report for related Taiwan Patent Application 095143988 (Reference BE).
Reference AG corresponds to Reference AA.
Reference AI corresponds to Reference AB.
Reference AJ corresponds to Reference AC.
Taiwan Office Action for related Taiwan Patent Application 095143988, issued Mar. 31, 2011.
Taiwan Office Action for related Taiwan Patent Application 095143988, issued Mar. 31, 2011.

* cited by examiner

*Primary Examiner* — Nathan M Nutter
(74) *Attorney, Agent, or Firm* — Staas & Halsey LLP

(57) ABSTRACT

An optical material having a high birefringence and a small absolute value of a photoelastic coefficient is provided by use of a resin composition for an optical material comprising a resin (a) having a positive photoelastic coefficient and a negative inherent birefringence and a resin (b) having a negative photoelastic coefficient and a negative inherent birefringence.

17 Claims, No Drawings

RESIN COMPOSITION FOR OPTICAL MATERIAL

CROSS REFERENCE TO RELATED APPLICATIONS

The present application is a continuation-in-part of PCT/JP2006/319425 filed on Sep. 29, 2006 which claims priority of Japanese Patent Application No. 2005-294560 filed in Japan on Oct. 7, 2005, Japanese Patent Application No. 2005-338105 filed in Japan on Nov. 24, 2005 and Japanese Patent Application No. 2006-202516 filed in Japan on Jul. 25, 2006. The entire disclosure of this PCT/JP2006/319425 is hereby incorporated by reference in their entirety.

BACKGROUND

1. Technical Field

The present invention relates to a resin composition suitable for use as a material for manufacturing an optical element, that is, an optical material, and a molded article including the resin composition.

More particularly, the present invention relates to a resin composition suitable for manufacturing an optical element that utilizes its birefringence, and a molded article including the resin composition.

2. Background Art

In recent years, with growth in the display panel market, the demand for a clearer image has increased. To meet this demand, instead of a simple transparent material, an optical material having advanced optical characteristics is required.

One such advanced optical characteristic is birefringence. In general, a polymer has different indices of refraction in a direction of the molecular main chain and in a direction perpendicular to the molecular main chain, and hence birefringence is generated. In certain applications, it is necessary to strictly control this birefringence. For example, to be used as a protective film on a polarizer of a liquid crystal, a polymeric molded article should have a smaller birefringence and evenly transmit all wavelengths of light. A typical example of such a molded article is a film made of triacetyl cellulose. On the other hand, birefringence can be utilized to change linear polarization to circular polarization (a ¼ wavelength plate or the like), or to compensate for the birefringence of the liquid crystal (an optical compensation film such as a retarder film). Polycarbonates are well known for these birefringent uses.

In recent years, liquid crystal displays are getting larger. Accordingly, the polymer optical elements (such as the retarder films) need to get larger. However, in larger displays, greater external pressure is applied to the optical element. Therefore, if the optical element is formed of a material whose birefringence easily changes when external pressure is applied, the birefringence of the optical element will change across the display, resulting in nonuniform contrast.

The extent to which birefringence changes with the application of external pressure is represented by a photoelastic coefficient. The above described polycarbonates have large photoelastic coefficients. Therefore, to replace these polycarbonates, birefringent optical materials having small photoelastic coefficients are desired.

A retarder film made of a styrene-acrylonitrile copolymer is known (Patent Document 1). However, this film has a large photoelastic coefficient, and hence it is not a satisfactory retarder film.

A blend of a styrene-acrylonitrile copolymer and an acrylic resin (Non-Patent Document 1), a blend of a styrene-methacrylic acid copolymer and an acrylic resin (Patent Document 2), and a blend of a styrene-maleic anhydride copolymer and an acrylic resin (Non-Patent Document 2) are known. However, these blends are not intended to be used as optical materials.

A resin composition containing a styrene-maleic anhydride copolymer and a polycarbonate is known (Patent Document 3). However, this resin composition is a combination of resins having positive photoelastic coefficients, and hence an absolute value of the photoelastic coefficient of the composition is large.

A retarder film made of resins having positive and negative inherent birefringences (Patent Document 4) is also known. However, the film which is specifically disclosed in Patent Document 4 is a film formed from a combination of resins having positive photoelastic coefficients, and this kind of film has a large photoelastic coefficient.

Moreover, a retarder film made of resins having positive and negative photoelastic coefficients is also known (Patent Document 5). In this retarder film, however, a resin having a large photoelastic coefficient ($60 \times 10^{-8}$ cm$^2$/N ($=60 \times 10^{-12}$ Pa$^{-1}$) or more) is used as the resin having the positive photoelastic coefficient to provide high birefringence necessary for the retarder film. Therefore, usable materials are limited, and there is a problem that the desired optical characteristics cannot freely be designed.

Furthermore, in recent years there has been a need for controlling not only the in-plane retardation of the retarder film but also controlling the retardation in the thickness direction of the retarder film in order to obtain a higher image quality of a liquid crystal display. Thus, in a retarder film for a horizontal electric field (IPS) mode liquid crystal display which has become more popular in recent years, it is preferable that the retardation in the thickness direction is negative. However, the conventional optical film made of triacetyl cellulose or a polycarbonate, and the retarder film disclosed in Patent Document 5, have retardations in the thickness direction which are positive. Therefore, there is a need for an optical film having a small absolute value of the photoelastic coefficient and a negative retardation in the thickness direction.

Patent Document 1: Japanese Patent Application Laid-Open No. 05-257014;
Patent Document 2: Japanese Patent Application Laid-Open No. 56-98251;
Patent Document 3: Japanese Patent Application Laid-Open No. 7-233296;
Patent Document 4: Japanese Patent Application Laid-Open No. 2002-40258;
Patent Document 5: Japanese Patent Application Laid-Open No. 2004-212971;
Non-Patent Document 1: T. Nishimoto, POLYMER, Vol. 30, p. 1279-1285, 1989; and
Non-Patent Document 2: D. Chopra, Society of Plastics Engineers. Annual Technical Conference, 59th, Vol. 2, p. 2326-2330, 2001.

DISCLOSURE OF THE INVENTION

Problem to be Solved by the Invention

An object of the present invention is to provide an optical material having a high birefringence, which changes only slightly when external pressure is applied. That is, the absolute value of the photoelastic coefficient for the optical material should be small.

Furthermore, another object of the present invention is to provide an optical material which exhibits a negative retardation in the thickness direction when formed into a molded article.

Means for Solving the Problem

The present inventors have found, as a result of intensive investigation on the birefringence of resin compositions, that a high birefringence can be imparted to the resin composition without causing the resin composition to have a large photoelastic coefficient, by using resins having either positive or negative photoelastic coefficients, respectively.

Furthermore, the present inventors have found that when the inherent birefringence of the main component resin is negative, the retardation in the thickness direction of a molded article of the resin composition can be negative.

On the basis of the above-mentioned findings, the present inventors have found that a resin composition comprising a resin (a) having a positive photoelastic coefficient at 23° C. and a negative inherent birefringence and a resin (b) having a negative photoelastic coefficient at 23° C. and a negative inherent birefringence exhibits a high birefringence and a small absolute value of the photoelastic coefficient. The inventors found that a molded article produced from this resin composition has a negative retardation in the thickness direction. In consequence, the present invention has been completed.

Thus, the present invention is as follows:

A resin composition for an optical material comprising: a resin (a) having a positive photoelastic coefficient at 23° C. and a negative inherent birefringence; and a resin (b) having a negative photoelastic coefficient at 23° C. and a negative inherent birefringence.

Effect of the Invention

An optical material having a high birefringence and a small absolute value of a photoelastic coefficient can be prepared by using a resin composition for an optical material of the present invention. Moreover, the value of the retardation of a molded article can be controlled by molding and drawing this optical material under specific conditions.

Therefore, it is possible to manufacture an optical compensation film that exhibits small fluctuation of external pressure bias-induced birefringence and excellent uniformity in contrast when it is used with a liquid crystal display device or the like.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Hereinafter, the present invention will be described in detail.

A resin composition for an optical material of the present invention comprises a resin (a) having a positive photoelastic coefficient at 23° C. and a negative inherent birefringence and a resin (b) having a negative photoelastic coefficient at 23° C. and a negative inherent birefringence.

"The photoelastic coefficient" in the present invention is a coefficient indicating the changeability in a birefringence induced by external pressure, and it is defined by the following formula:

$$C_R[Pa^{-1}] = \Delta n / \sigma_R$$

in which $\sigma_R$ is the stretch stress applied [Pa], $\Delta n$ is a birefringence at the time when stress is applied, and $\Delta n$ is defined by the following formula:

$$\Delta n = n_1 - n_2$$

in which $n_1$ is the index of refraction in the direction parallel to the stretching direction, and $n_2$ is the index of refraction in the direction perpendicular to the stretching direction.

The above formulas indicate that as the value of the photoelastic coefficient comes close to zero, the change in the birefringence induced by the external pressure is small, and this means that the birefringence preliminarily-designed for each application is not easily changed by external pressure.

"The inherent birefringence" in the present invention is a value indicating the magnitude of the birefringence which is generated by the orientation of a polymer, and it is defined by the following formula:

$$\text{inherent birefringence} = npr - nvt$$

in which npr is the index of refraction in the direction parallel to the orientation direction of an uniaxially-oriented polymer, and nvt is the index of refraction in the direction perpendicular to the orientation direction of the polymer.

In the present invention, the resin having the negative inherent birefringence is a resin consisting of such a polymer that light incident to a uniaxially-oriented layer of the polymer displays a smaller index of refraction in the orientation direction than in a direction perpendicular to the orientation direction.

The resin (a) will be described.

With respect to the resin (a) in the present invention, a styrene resin is used wherein the resin satisfies conditions that the photoelastic coefficient at 23° C. of the resin is positive and the inherent birefringence thereof is negative.

In the present invention, the styrene resin is a polymer comprising at least a styrene monomer as a monomer component. Here, the styrene monomer is a monomer having a styrene skeleton in a structure thereof.

Specific examples of the styrene monomer include vinyl aromatic compound monomers, i.e., styrene; nuclear alkyl-substituted styrenes such as o-methyl styrene, m-methyl styrene, p-methyl styrene, 2,4-dimethyl styrene, ethyl styrene and p-tert-butyl styrene, and α-alkyl-substituted styrenes such as α-methyl styrene and α-methyl-p-methyl styrene. A typical example is styrene.

The styrene resin may be a copolymer of the styrene monomer component and another monomer component. Examples of a copolymerizable monomer include alkyl methacrylates such as methyl methacrylate, cyclohexyl methacrylate, methyl phenyl methacrylate and isopropyl methacrylate; unsaturated carboxylic alkyl ester monomers of alkyl acrylates such as methyl acrylate, ethyl acrylate, butyl acrylate, 2-ethylhexyl acrylate and cyclohexyl acrylate; unsaturated carboxylic acid monomers such as methacrylic acid, acrylic acid, itaconic acid, maleic acid, fumaric acid and cinnamic acid; unsaturated dicarboxylic acid anhydride monomers such as maleic anhydride and anhydrides of itaconic acid, ethyl maleic acid, methyl itaconic acid and chlormaleic acid; unsaturated nitrile monomers such as acrylonitrile and methacrylonitrile; and conjugated diene such as 1,3-butadiene, 2-methyl-1,3-butadiene(isoprene), 2,3-dimethyl-1,3-butadiene, 1,3-pentadiene and 1,3-hexadiene. Such comonomers can be used singly, or in combination of two or more thereof.

A copolymerization ratio for such an 'other' monomer component is preferably 50% by mass or less, more preferably 40% by mass or less, with respect to the styrene monomer component.

With respect to resin (a), styrene-acrylonitrile copolymer, styrene-methacrylic acid copolymer and styrene-maleic anhydride copolymer are used, because properties such as heat resistance and transparency of these copolymers are suitable for the optical material.

Moreover, the styrene-acrylonitrile copolymer, the styrene-methacrylic acid copolymer and the styrene-maleic anhydride copolymer exhibit good miscibility with a polymer comprising methyl methacryalte as a monomer component, and hence these copolymers are especially preferable when the polymer comprising methyl methacrylate as a monomer component is used as the resin (b).

In the styrene-acrylonitrile copolymer, a content of aclylonitrile in the copolymer is 1 to 40% by mass. A further preferable range is 1 to 30% by mass, and an especially preferable range is 1 to 25%. The styrene-acrylonitrile copolymer with the content of acrylonitrile of 1 to 40% by mass is preferable because such a copolymer exhibits excellent transparency.

In styrene-methacrylic acid copolymer, a content of methacrylic acid in the copolymer is 0.1 to 50% by mass. A more preferable range is 0.1 to 40% by mass, and a further preferable range is 0.1 to 30% by mass. The styrene-methacrylic acid copolymer with the content of methacrylic acid of 0.1% by mass or more is used because such a copolymer exhibits excellent heat resistance. In addition, the styrene-methacrylic acid copolymer with the content of methacrylic acid of 50% by mass or less is used because such a copolymer exhibits excellent transparency.

In styrene-maleic anhydride copolymer, a content of maleic anhydride in the copolymer is 0.1 to 50% by mass. A more preferable range is 0.1 to 40% by mass, and a further preferable range is 0.1% by mass to 30% by mass. The styrene-maleic anhydride copolymer with the content of maleic anhydride in the copolymer of 0.1% by mass or more is used because such a copolymer is excellent in heat resistance. In addition, the styrene-maleic anhydride copolymer with the content of maleic anhydride of 50% by mass or less is used because such a copolymer exhibits excellent transparency.

Among these copolymers, the styrene-methacrylic acid copolymer and the styrene-maleic anhydride copolymer are especially preferable from a viewpoint of heat resistance.

With respect to resin (a), different types of styrene resins having different compositions or molecular weights may be used in combination. The styrene resin can be obtained by a known method including anion, bulk, suspension, emulsion or solution polymerization method. In the styrene resin, unsaturated double bonds of a conjugated diene or a benzene ring of the styrene monomer may be hydrogenated. A hydrogenation ratio can be measured by a nuclear magnetic resonance apparatus (NMR).

The photoelastic coefficient at 23° C. of the resin (a) in an undrawn state is preferably $60 \times 10^{-12}$ $Pa^{-1}$ or less, further preferably $30 \times 10^{-12}$ $Pa^{-1}$ or less, especially preferably $6 \times 10^{-12}$ $Pa^{-1}$ or less. When the photoelastic coefficient of the resin (a) is within this range, an optical film having a small photoelastic coefficient and desired Rth can be obtained.

The resin (b) will be described.

With respect to the resin (b) in the present invention, an acrylic resin is used wherein the resin satisfies conditions that the photoelastic coefficient of the resin is negative and the inherent birefringence thereof is negative.

In the present invention, the acrylic resin is a polymer comprising acrylic acid, methacrylic acid or a derivative thereof as a monomer component.

The acrylic resin can include a copolymer of acrylic acid, methacrylic acid or derivative thereof with another monomer component. A content (copolymerization ratio) of such another monomer component is preferably less than 60% by mass with respect to the acrylic resin (A). It is more preferably less than 55% by mass.

Among these acrylic resins, a polymer comprising an alkyl ester of acrylic acid or an alkyl ester of methacrylic acid as the monomer component is especially preferable when the styrene resin is used as the resin (a), because the above polymer exhibits good miscibility with the styrene resin.

A specific example of the acrylic resin comprising the alkyl ester of acrylic acid or the alkyl ester of methacrylic acid as the monomer component includes a polymer of one or more monomers selected from the group consisting of alkyl esters of methacrylic acid such as cyclohexyl methacrylate, t-butylcyclohexyl methacrylate and methyl methacrylate; and alkyl esters of acrylic acid such as methyl acrylate, ethyl acrylate, butyl acrylate, isopropyl acrylate and 2-ethylhexyl acrylate.

Moreover, examples of the acrylic resin comprising the alkyl ester of acrylic acid or the alkyl ester of methacrylic acid as the monomer component also include copolymers which also comprise monomer other than the alkyl ester of methacrylic acid and the alkyl ester of acrylic acid.

Examples of monomers copolymerizable with the alkyl ester of acrylic acid and the alkyl ester of methacrylic acid other than the alkyl ester of methacrylic acid and the alkyl ester of acrylic acid include aromatic vinyl compounds such as styrene, vinyl toluene and α-methyl styrene; vinyl cyanides such as acrylonitrile and methacrylonitrile; maleimides such as N-phenyl maleimide and N-cyclohexyl maleimide; unsaturated carboxylic anhydrides such as maleic anhydride; and unsaturated acids such as acrylic acid, methacrylic acid and maleic acid. They can be used singly or in combination of two or more thereof.

When the monomer component other than the alkyl ester of methacrylic acid and the alkyl ester of acrylic acid is comprised, a copolymerization ratio of the monomer component is less than 50% by mass with respect to the alkyl ester of methacrylic acid or the alkyl ester of acrylic acid. The ratio is further preferably 40% by mass or less, especially preferably 30% by mass or less. The copolymer with the copolymerization ratio of less than 50% by mass exhibits an excellent optical characteristic such as all-wavelength light transmittance.

Among the polymers comprising the alkyl ester of acrylic acid or the alkyl ester of methacrylic acid as the monomer component, a homopolymer of methyl methacrylate and a copolymer of methyl methacrylate and another monomer are preferable, because properties such as heat resistance and transparency of them are suitable for the optical material.

As monomers to be copolymerized with methyl methacrylate, the alkyl esters of acrylic acid are especially preferable, because they have excellent thermal decomposition resistance and methacrylic resins obtained by their copolymerization have high fluidity during molding. An amount of alkyl ester of acrylic acid when methyl methacrylate is copolymerized with the alkyl ester of acrylic acid is preferably 0.1% by mass or more from a viewpoint of the thermal decomposition resistance, and preferably 15% by mass or less from a viewpoint of heat resistance. The amount is further preferably 0.2% by mass or more and 14% by mass or less, especially preferably 1% by mass or more and 12% by mass or less.

Among alkyl esters of acrylic acid, methyl acrylate and ethyl acrylate are preferable, because even when they are copolymerized in a small amount with methyl methacrylate, an effect of improving the fluidity during the molding is remarkably achieved.

A mass-average molecular weight of the acrylic resin is preferably 50,000 to 200,000. The mass-average molecular weight is preferably 50,000 or more from a viewpoint of strength of a molded product, and preferably 200,000 or less from viewpoints of molding properties and fluidity. A further preferable range is 70,000 to 150,000.

Moreover, in the present invention, an isotactic polymethacrylate ester and a syndiotactic polymethacrylate ester can simultaneously be used.

As a method for manufacturing the acrylic resin, any conventional polymerization method such as cast polymerization, bulk polymerization, suspension polymerization, solution polymerization, emulsion polymerization or anion polymerization can be employed. For optical use applications, it is preferable to avoid contamination with micro foreign materials as much as possible, and from this viewpoint, the bulk polymerization and the solution polymerization in which any suspending medium or emulsifier is not used are preferable.

When the solution polymerization is carried out, a solution of a mixture of monomers dissolved in a solvent of an aromatic hydrocarbon such as toluene or ethyl benzene can be used. When bulk polymerization is carried out, the polymerization can be started with free radicals generated by heating or ionizing radiation irradiation.

As an initiator for a polymerizing reaction, any initiator for the radical polymerization can be used. For example, an azo compound such as azobisisobutyl nitrile, or organic peroxide such as benzoyl peroxide, lauroyl peroxide or t-butylperoxy-2-ethyl hexanoate can be used.

In particular, when the polymerization is carried out at a high temperature of 90° C. or more, the solution polymerization is generally employed. Therefore, a preferred initiator includes a peroxide, and an azobis initiator or the like, which have a half-life period temperature for 10 hours of 80° C. or more and which are soluble in an organic solvent used. Examples of the initiator include 1,1-bis(t-butylperoxy)-3,3,5-trimethylcyclohexane, cyclohexane peroxide, 2,5-dimethyl-2,5-di(benzoylperoxy)hexane, 1,1-azobis(1-cyclohexane carbonitrile), and 2-(carbamoylazo)isobutylonitrile.

Such an initiator is preferably used within a range of, for example, 0.005 to 5% by mass.

As a molecular weight adjustment agent which is optionally used in the polymerizing reaction, any agent can be used. Especially preferred molecular weight adjustment agents include mercaptan compounds such as butyl mercaptan, octyl mercaptan, dodecyl mercaptan and 2-ethylhexyl thioglycollate.

The molecular weight adjustment agent is added at such a concentration that the polymerization degree of the acrylic resin is controlled within a preferable range.

With respect to the resin (b), a methyl methacrylate homopolymer, a methyl methacrylate-methyl acrylate copolymer, or a methyl methacrylate-ethyl acrylate copolymer is preferable, and above all, the methyl methacrylate-methyl acrylate copolymer is preferable in that the copolymer achieves a good balance between fluidity during molding and heat resistance.

Other preferred examples of the resin (b) include three or more component copolymers obtained by copolymerizing the methacrylate ester and/or acrylate ester with two or more other monomers.

Examples of the other monomer components to be copolymerized with the methacrylate ester and/or acrylate ester include aromatic vinyl compounds such as styrene, α-methylstyrene, o-methylstyrene, p-methylstyrene, o-ethylstyrene, p-ethylstyrene and p-t-butylstyrene; vinyl cyanides such as acrylonitrile, methacrylonitrile and ethacrylonitrile; maleimides such as N-methylmaleimide, N-ethylmaleimide, N-cyclohexylmaleimide, N-phenylmaleimide, acrylamide, methacrylamide, N-methylacrylamide, butoxymethylacrylamide, and N-propylmethacrylamide; unsaturated carboxylic anhydrides such as maleic anhydride and itaconic anhydride; unsaturated carboxylic acids such as acrylic acid, methacrylic acid, crotonic acid, α-substituted acrylic acid, α-substituted methacrylic acid and maleic acid; and unsaturated carboxylic acid alkyl esters such as methyl(meth)acrylate, ethyl(meth)acrylate, n-propyl(meth)acrylate, n-butyl(meth)acrylate, t-butyl(meth)acrylate, n-hexyl(meth)acrylate, cyclohexyl(meth)acrylate, chloromethyl(meth)acrylate, 2-chloroethyl(meth)acrylate, 2-hydroxyethyl(meth)acrylate, 3-hydroxypropyl(meth)acrylate, 2,3,4,5,6-pentahydroxyhexyl(meth)acrylate and 2,3,4,5-tetrahydroxypentyl(meth)acrylate.

Among the three or more component copolymers obtained by copolymerizing the methacrylate ester and/or acrylate ester with two or more other monomers, especially preferred is a copolymer B having a methacrylate ester and/or acrylate ester unit, an aromatic vinyl compound unit, and a compound unit represented by the following chemical formula [1]:

Chemical formula [1]

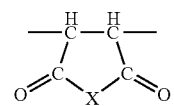

(wherein, X represents O or N—R, in which O represents an oxygen atom, N represents a nitrogen atom, and R represents a hydrogen atom, an alkyl group, an aryl group, or a cycloalkane group).

Specific examples of the methacrylate ester and/or acrylate ester serving as the first monomer component of the copolymer B include methacrylate esters such as methyl methacrylate, ethyl methacrylate, propyl methacrylate, n-butyl methacrylate, n-hexyl methacrylate, cyclohexyl methacrylate, and t-butylcyclohexyl methacrylate; and acrylate esters such as methyl acrylate, ethyl acrylate, butyl acrylate, isopropyl acrylate, and 2-ethylhexyl acrylate. Of these, methyl methacrylate is preferred.

Specific examples of the aromatic vinyl compound serving as the second monomer component of the copolymer B include nucleus-alkyl substituted styrenes such as styrene, o-methylstyrene, m-methylstyrene, p-methylstyrene, 2,4-dimethylstyrene, ethylstyrene and p-tert-butylstyrene; and α-alkyl substituted styrenes such as α-methylstyrene and α-methyl-p-methylstyrene. Of these, styrene is preferred.

Of the units represented by the chemical formula [1] and serving as the third monomer component of the copolymer B, examples of the unit having O as X include unsaturated dicarboxylic anhydride monomer units such as maleic anhydride, itaconic anhydride, ethylmaleic anhydride, methylitaconic anhydride and chloromaleic anhydride. Of these, maleic anhydride is most preferred. Examples of the unit having N—R as X include maleimide monomers such as N-phenylmaleimide and N-cyclohexylmaleimide.

With regards to the copolymerization ratio of the monomer units constituting the copolymer B, it is preferred considering heat resistance and the photoelastic coefficient that the copolymerization ratio of the methacrylate ester and/or acrylate ester unit is 40% by mass or more and 90% by mass or less, that of the aromatic vinyl compound unit is 5% by mass or more and 40% by mass or less, and that of the compound unit represented by the chemical formula [1] is 5% by mass or more and 20% by mass or less.

It is more preferred that the copolymerization ratio of the methacrylate ester and/or acrylate ester unit is 42% by mass or more and 83% by mass or less, that of the aromatic vinyl compound unit is 12% by mass or more and 40% by mass or less, and that of the compound unit represented by the chemical formula [1] is 5% by mass or more and 18% by mass or less.

It is still more preferred that the copolymerization ratio of the methacrylate ester and/or acrylate ester unit is 45% by mass or more and 78% by mass or less, that of the aromatic vinyl compound unit is 16% by mass or more and 40% by mass or less, and that of the compound unit represented by the chemical formula [1] is 6% by mass or more and 15% by mass or less.

Moreover, the copolymerization ratio of the aromatic vinyl compound unit is preferably 1 time or more and 3 times or less as much as that of the compound unit represented by the chemical formula [1].

The copolymer B can include a heat-resistant acrylic resin obtained by copolymerizing the above-described essential monomer components with another monomer copolymerizable therewith as needed. Examples of the another copolymerizable monomer usable here include unsaturated carboxylic acid monomers such as methacrylic acid, acrylic acid, itaconic acid, maleic acid, fumaric acid and cinnamic acid; unsaturated nitrile monomers such as acrylonitrile and methacrylonitrile; and conjugated dienes such as 1,3-butadiene, 2-methyl-1,3-butadiene (isoprene), 2,3-dimethyl-1,3-butadiene, 1,3-pentadiene and 1,3-hexadiene. It is also possible to copolymerize with two or more of these monomers.

As a preparation process of the copolymer B, bulk polymerization using a radical initiator is suitable, but solution polymerization or emulsion polymerization can also be employed.

Water-based suspension polymerization is not recommended when maleic anhydride is used as a monomer component, because a stable suspension system cannot be maintained constantly owing to high water solubility of maleic anhydride.

Among typical radical initiators, an azo initiator such as azobisisobutyronitrile or 2,2'-azobis(2,4-dimethylvaleronitrile) or a peroxide initiator such as benzoyl peroxide used for preparing the copolymer B sometimes causes coloration of the resulting polymer.

Use of lauroyl peroxide, decanoyl peroxide or t-butylperoxy-2-ethylhexanoate as the peroxide initiator does not cause coloration of the heat-resistant acrylic resin (B-3). A polymer obtained using t-butylperoxy-2-ethylhexanoate however has low water resistance and gains weight when immersed in hot water so that it sometimes has a whitened surface.

Use of a diacyl peroxide such as lauroyl peroxide is therefore preferred for polymerization to obtain the copolymer B.

Preferred examples of a polymerization method for the copolymer B include a method described in Japanese Patent Publication No. 63-1964.

A melt index (ASTM D1238; condition I) of the copolymer B is preferably 10 g/10 minutes or less from the viewpoint of the strength of a molded article. It is more preferably 6 g/10 minutes or less, still more preferably 3 g/10 minutes or less.

With respect to the resin (b), different types of acrylic resins having different compositions or molecular weights can be used in combination.

The photoelastic coefficient at 23° C. of the resin (b) in an undrawn state is preferably $-60 \times 10^{-12}$ $Pa^{-1}$ or more, further preferably $-30 \times 10^{-12}$ $Pa^{-1}$ or more, especially preferably $-6 \times 10^{-12}$ $Pa^{-1}$ or more. When the photoelastic coefficient of the resin (b) is within this range, an optical film having a small photoelastic coefficient and a desired Rth can be obtained.

Next, a resin composition for an optical material according to the present invention will be described.

It is preferable that the resins (a) and (b) are miscible with each other. The miscibility can be achieved by appropriately selecting compositions of the resins (a), (b) (including a copolymer composition), a blend ratio, a kneading temperature, a kneading pressure, a cooling temperature, a cooling rate and the like. The miscibility is described in detail in "High-Performance Polymer Alloy" (edited by the Society of Polymer Science, Japan, issued in 1991 by Maruzen Co., Ltd.). When the resins (a) and (b) are miscible with each other, the all-wavelength light transmittance of the molded article of the resin composition comprising the resins (a) and (b) can be increased.

From such a viewpoint, in the present invention, it is preferable to combine the styrene resin as the resin (a) with the acrylic resin as the resin (b). By selecting the resins (a) and (b) in this combination, it is possible to manufacture an optical element having high stability free from deterioration of transparency caused by phase separation during use.

In the resin composition for the optical material of the present invention, the photoelastic coefficient of the composition can be controlled by adjusting contents of the resins (a) and (b) and a mass ratio between the resins (a) and (b).

A content of the resin (a) in the resin composition for the optical material of the present invention is preferably 0.1 to 99.9 parts by mass, more preferably 0.2 to 90 parts by mass, especially preferably 20 to 80 parts by mass. A content of the resin (b) is preferably 0.1 to 99.9 parts by mass, more preferably 10 to 99.8 parts by mass, especially preferably 20 to 80 parts by mass.

Moreover, a total of the contents of the resins (a) and (b) is preferably 70% by mass or more with respect to the resin composition, further preferably 80% by mass or more, especially preferably 90% by mass or more.

Furthermore, a preferred mass ratio between the resins (a) and (b) (i.e., (a)/(b)) depends upon the types of resins (a) and (b), but it is preferably 0.1/99.9 to 99.9/0.1, further preferably 20/80 to 80/20, especially preferably 40/60 to 60/40.

The resin composition for the optical material of the present invention preferably comprise ultraviolet absorbent (c) of 0.1 to 10 parts by mass, further preferably 0.1 to 2 parts by mass, especially preferably 0.1 to 1.5 parts by mass or less with respect to 100 parts by mass of the total of the resins (a) and (b).

By adding an ultraviolet absorbent (c) in that amount, the photoelastic coefficient and the spectral transmittance can be controlled within preferable ranges. However, when an excess amount of ultraviolet absorbent (c) is added, the photoelastic coefficient increases, which is not preferable for the optical material.

The content of the ultraviolet absorbent (c) can be determined based on the ratio of integral values of peak signal areas of proton NMR obtained by a nuclear magnetic resonance apparatus (NMR), or it can be determined by gas chromatography (GC) after extracting the ultraviolet absorbent (c) from the resin by using a good solvent.

Examples of the ultraviolet absorbent (c) include a benzotriazole compound, a triazine compound, a benzoate compound, a benzophenone compound, an oxybenzophenone compound, a phenol compound, an oxazole compound, a malonate ester compound, a cyanoacrylate compound, a lactone compound, a salicylate ester compound, and a benzoxazinone compound. The benzotriazole compound and a benzotriazine compound are preferable. They may be used singly or in a combination of two or more thereof.

Preferred vapor pressure (P) of the ultraviolet absorbent (c) at 20° C. is $1.0 \times 10^{-4}$ Pa or less, in order to achieve excellent molding properties. The vapor pressure (P) is further preferably $1.0 \times 10^{-6}$ Pa or less, especially preferably $1.0 \times 10^{-8}$ Pa or less. Here, excellent molding property means, for example, that the adhesion of a low molecular compound to a roll during film molding is reduced. When the low molecular compound adheres to the roll, the compound also adheres to the surface of the molded article, and the appearance and the optical characteristics of the molded article are deteriorated. Such a molded article is not suitable for the optical material.

The following are compounds represented by the chemical formulas [2] and [3] as specific examples of the benzotriazole compounds and compounds represented by the chemical formula [4] as specific examples of the benzotriazine compounds, each preferably used in the present invention as the ultraviolet absorbent.

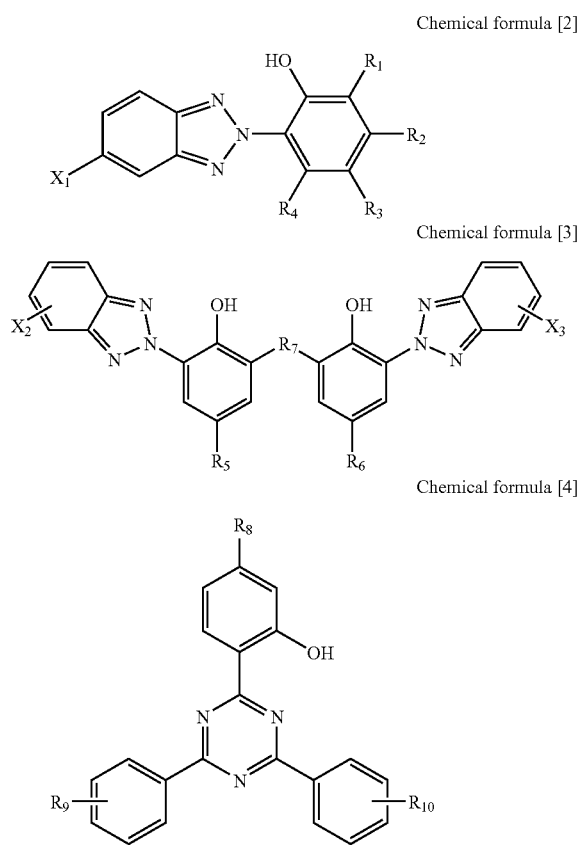

Chemical formula [2]

Chemical formula [3]

Chemical formula [4]

In the chemical formula [2], $X_1$ represents a hydrogen atom, a halogen atom, or a substituted or unsubstituted $C_{1-5}$ alkyl or an alkoxy group, $R_1$ to $R_4$ each independently represents a hydrogen atom or a substituted or unsubstituted $C_{1-20}$ alkyl group. In the chemical formula [3], $X_2$ and $X_3$ each independently represents a hydrogen atom or a halogen atom, $R_5$ and $R_6$ each independently represents a hydrogen atom or a substituted or unsubstituted $C_{1-20}$ alkyl group and $R_7$ represents a substituted or unsubstituted $C_{1-4}$ alkylene group. In the chemical formula [4], $R_8$ represents a substituted or unsubstituted $C_{1-20}$ alkyl or alkoxy group, and $R_9$ and $R_{10}$ each independently represents a hydrogen atom or a substituted or unsubstituted $C_{1-20}$ alkyl group.

Preferred melting point (Tm) of the ultraviolet absorbent (c) is 80° C. or more, in order to achieve excellent molding properties. The melting point (Tm) is further preferably 130° C. or more, and the melting point (Tm) is especially preferably 160° C. or more.

Moreover, the mass decrease ratio of the ultraviolet absorbent (c) in heating from 23° C. to 260° C. at a rate of 20° C./min is preferably 50% or less, in order to achieve excellent molding properties. The mass decrease ratio is more preferably within the range of 15% or less, and especially preferably 2% or less.

The resin composition of the present invention can comprise a polymer other than the resin (a) and (b) components in such an amount that the object of the present invention is not impaired. Examples of the polymer other than the resins (a) and (b) include rubber components such as olefin elastomer, styrene elastomer and acrylic rubber; thermoplastic resins, for example, polyolefin such as polyethylene and polypropylene, polyamide, polyphenylene sulfide resin, polyether ether ketone resin, polyester, polysulfone, polyphenylene oxide, polyimide, polyether imide, and polyacetal; and thermosetting resins such as a phenol resin, a melamine resin, a silicone resin and an epoxy resin.

A content of the polymer other than the resins (a) and (b) is preferably 30% by mass or less with respect to the resin composition.

Furthermore, any additive can be blended with the resin composition of the present invention in any amount if it will not substantially impair the object of the present invention. There is no special limitation on such an additive as long as the additive is conventionally blended with a resin or a rubber-like polymer. Examples of the additive include an inorganic filler; a pigment such as iron oxide; lubricants such as stearic acid, behenic acid, zinc stearate, calcium stearate, magnesium stearate, and ethylene bisstearoamide; a mold release agent; softeners/plasticizers such as paraffin process oil, naphthene process oil, aromatic process oil, paraffin, organic polysiloxane, and mineral oil; antioxidants such as a hindered phenol antioxidant and a phosphoric heat stabilizer; ultraviolet absorbents such as a hindered amine light stabilizer, a phenol antioxidant having an acrylate group, a benzotriazole ultraviolet absorbent and a benzophenone ultraviolet absorbent; a flame retardant; an antistatic agent; reinforcing agents such as an organic fiber, a glass fiber, a carbon fiber and a metal whisker; a colorant and the like.

A total amount of the ultraviolet absorbent and the other additives is preferably 20 parts by mass or less, more preferably 10 parts by mass or less with respect to a total of 100 parts by mass of the polymers constituting the optical film.

When the antioxidant is incorporated in the resin composition for an optical material of the present invention, it is incorporated preferably in an amount ranging of 0.01% by mass or more and 2% by mass or less, more preferably 0.05% by mass or more and 2% by mass or less, especially preferably 0.1% by mass and more and 2.0% by mass or less, with respect to the resin composition constituting the film.

When the amount of the antioxidant is less than 0.01% by mass, the resulting film has poor heat stability during high humidity processing and generation of unwanted matters cannot always be suppressed sufficiently. When the amount exceeds 2% by mass, on the other hand, an excessive volatile content may deteriorate the processing properties of the film.

In the present invention, use of a phenol antioxidant is preferred. A phenol antioxidant having, in the molecule thereof, an acrylate group is especially preferred. The phenol antioxidant, especially the phenol antioxidant having, in the molecule thereof, an acrylate group, can prevent gelation of a high-molecular-weight resin in the resin composition and generation of unwanted matters in the molded article which will otherwise occur by heat during molding. Moreover, even if it is added in a large amount to the resin composition, it does not significantly change the photoelastic coefficient of the resin composition.

As the phenol antioxidant having, in the molecule thereof, an acrylate group, compounds represented by the following chemical formula [5] are preferred.

Chemical formula [5]

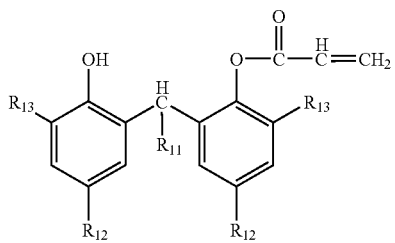

In the chemical formula [5], $R_{11}$ represents a hydrogen atom or a substituted or unsubstituted $C_{1-10}$ alkyl group, and $R_{12}$ and $R_{13}$ each independently represents a $C_{1-8}$ alkyl group.

The substituted or unsubstituted $C_{1-10}$ alkyl group as $R_{11}$ in the chemical formula [5] may be linear, branched or cyclic. $R_{12}$ and $R_{13}$ each represents preferably a quaternary-carbon-containing structure represented by [*—(CH$_3$)$_2$—R'] (in which * stands for a connection site to the aromatic ring and R' represents a $C_{1-5}$ alkyl group).

$R_{12}$ is more preferably a t-butyl group, t-amyl group or t-octyl group, while $R_{13}$ is more preferably t-butyl group or t-amyl group.

Examples of the compound represented by the chemical formula [5] which are commercially available include "Sumilizer GM" (chemical formula [6]) and "Sumilizer GS" (chemical formula [7]) (each, trade name; product of Sumitomo Chemical Co., Ltd.). They may be used either singly or in combination of two or more thereof.

Chemical formula [6]

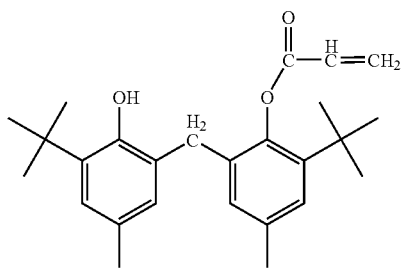

Chemical formula [7]

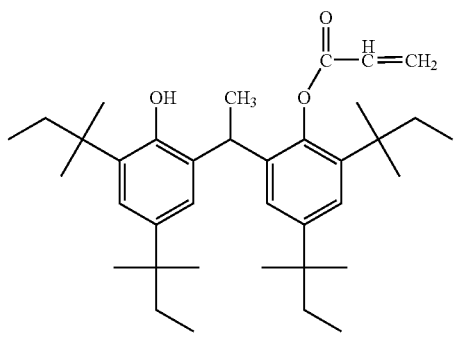

The antioxidant having a melting point (Tm) of 50° C. or more is preferred because heat resistance is excellent. The melting point (Tm) is more preferably 80° C. or more, especially preferably 100° C. or more.

An amount of the antioxidant can be determined from an integration ratio of peak signals based on proton NMR measured using a nuclear magnetic resonance (NMR) apparatus or by extracting it from the resin with a good solvent and then measuring the extract by gas chromatography (GC).

There is no special limitation on a manufacturing method of a resin composition for an optical material of the present invention, and a known method can be employed. The resins (a) and (b) and, if necessary, the other components can be melted and kneaded to manufacture the resin composition by use of a uniaxial extruder, a biaxial extruder, Banbury mixer, Brabender or a melting kneader such as any type of kneader.

Next, a molded article for an optical element obtained using the resin composition for the optical material of the present invention will be described.

There is no special limitation on a molding method, and a known method can be employed. Molding can be carried out by a method such as injection molding, sheet molding, blow molding, injection blow molding, inflation molding, extrusion molding or foam molding, and a secondary processing molding process such as pneumatic molding or vacuum molding may be used.

In the present invention, a configuration of the molded article for the optical element can be a film or a sheet.

In the present invention, a film is a body with a thickness of 300 μm or less, and a sheet is a body with a thickness of 300 μm or more. Moreover, in the present invention, the thickness of the film is preferably 1 μm or more, more preferably 5 μm or more. The thickness of the sheet is preferably 10 mm or less, more preferably 5 mm or less.

When the molded article for the optical element of the present invention is a film or sheet, it is preferable that the article is molded by a technique such as extrusion molding or cast molding. An undrawn film or sheet can be prepared by extrusion molding with an extruder to which a T-die, a circular die or the like is attached. When a molded article is prepared by the extrusion molding, the resins (a) and (b) can be melted and kneaded in advance, or can be melted and kneaded during extrusion molding. The resins (a) and (b) can also be dissolved in a common solvent for the resins (a) and (b), for example, chloroform or methylene dichloride, then cast, dried and cured to prepare undrawn film by cast molding.

Furthermore, the undrawn film or sheet may optionally be uniaxially drawn in a mechanical flow direction or in a direction perpendicular to the mechanical flow direction. The film or sheet may also be biaxially drawn by a biaxial drawing process such as sequential biaxial drawing by roll drawing and tenter drawing, simultaneous biaxial drawing by tenter drawing, or biaxial drawing by tubular drawing, to manufacture the biaxially drawn film or sheet.

Drawing is preferably performed under a temperature of (Tg−20° C.) to (Tg+50° C.) on the basis of a glass transition temperature (Tg).

Moreover, the draw ratio is preferably 0.1 to 1000% in either direction, more preferably 0.2 to 600%, and especially preferably 0.3 to 300%. A molded article for the optical element with a draw ratio within this range exhibits an excellent birefringence, heat resistance and strength.

The draw ratio can be determined by using the following formula by having a resultant drawn film or sheet shrunk at a temperature which is 50° C. or more higher than the glass transition temperature. The glass transition temperature can be determined by the DSC method or the viscoelasticity method.

Draw ratio(%)=[[length before shrinkage/length after shrinkage]−1]×100

By biaxially drawing a film with different draw ratio in the mechanical flow direction and the direction perpendicular to the mechanical flow direction, a film with a high strength and a high in-plane retardation is obtained. Such a film having a small photoelastic coefficient and a high retardation is preferably used as a retarder film.

On the other hand, by biaxially drawing a film with a substantially equal draw ratio in the mechanical flow direction and the direction perpendicular to the mechanical flow direction, a film with a high strength and a low in-plane retardation is obtained. Such a film having a small photoelastic coefficient and a low retardation is preferably used as a polarizer protective film.

The molded article for the optical element of the present invention can be used by laminating two or more of the same with different properties such as retardation, or by laminating on a polymer film other than the film of the present invention.

It is preferable that the molded article for the optical element of the present invention has a photoelastic coefficient absolute value at 23° C. of 0 to $5\times10^{-12}$ Pa$^{-1}$. The absolute value of the photoelastic coefficient at 23° C. is more preferably 0 to $4\times10^{-12}$ Pa$^{-1}$, further preferably 0 to $3.5\times10^{-12}$ Pa$^{-1}$, especially preferably 0 to $3.0\times10^{-12}$ Pa$^{-1}$ or less.

When the photoelastic coefficient of the molded article for the optical element is within this range, the birefringence change induced by an external pressure is small. Therefore, when the molded article is used with a large-sized liquid crystal display device or the like, an image with excellent contrast and screen uniformity is provided.

In the molded article for the optical element of the present invention, in-plane retardation (Re), retardation in thickness-direction (Rth) and $N_z$ coefficient can be controlled by designing the composition of the resin composition, the mass ratio between the resins (a) and (b), the thickness and the draw ratio of the molded article and the like.

In-plane retardation (Re), retardation in thickness-direction (Rth) and Nz are defined as the following formulas:

$Re=(n_x-n_y)\times d;$ $Rth=((n_x+n_y)/2-n_z)\times d;$ and $Nz=(n_x-n_z)/|(n_x-n_y)|,$ wherein $n_x$ is the main index of refraction in the x-direction when the x-direction is defined as a direction in a plane of a molded article, the index of refraction in which is maximum; $n_y$ is a main index of refraction in the y-direction which is perpendicular to the x-direction in the molded article plane; $n_z$ is a main index of refraction in the thickness direction of the molded article; and d is a thickness (nm) of the molded article.

Re for the molded article for the optical element of the present invention is preferably 0 to 400 nm, more preferably 5 to 350 nm, and especially preferably in excess of 20 nm and 350 nm or less.

When the molded article for the optical element of the present invention is used as a ¼ wavelength plate, the absolute value of Re is preferably 100 nm or more and 180 nm or less, more preferably 120 nm or more and 160 nm or less, and further preferably 130 nm or more and 150 nm or less.

When the molded article for the optical element of the present invention is used as ½ wavelength plate, the absolute value of Re is preferably 240 nm or more and 320 nm or less, more preferably 260 nm or more and 300 nm or less, and further preferably 270 nm or more and 290 nm or less.

An absolute value of Re/Rth of the molded article for the optical element of the present invention is preferably 3 or less, more preferably 0.1 to 2, and further preferably 0.2 to 1.5. The absolute value of Re/Rth can be controlled by adjusting the draw ratio in the MD, TD directions, film thickness, and mass ratio between the resins (a) and (b).

In the present invention, Rth of the molded article for the optical element can be designed to have a negative value. A film with a Rth having a negative value is suitable for an optical compensation film for a liquid crystal display. In particular, the film is suitable for a horizontal electric field (IPS) mode liquid crystal display. Rth is preferably −400 nm to −1 nm, further preferably −350 nm to −5 nm, especially preferably −300 nm to −10 nm. The value of Rth can be controlled by adjusting the draw ratio in the MD, TD directions, the film thickness, and the mass ratio between the resins (a) and (b).

The Nz coefficient of the molded article for the optical element of the present invention is preferably −5 to 0, more preferably −3 to 0, especially preferably −1.5 to 0. A film with a coefficient within this range is suitable for a compensation film for the liquid crystal display. In particular, the film is suitable for the horizontal electric field (IPS) mode liquid crystal display. The Nz coefficient can be controlled by adjusting draw ratio in the MD, TD directions, film thickness, and mass ratio between the resins (a) and (b).

The all-wavelength light transmittance of the molded article for the optical element of the present invention is preferably 80% or more, more preferably 85% or more, further preferably 87% or more, and especially preferably 90% or more.

Such all-wavelength light transmittance can be achieved by achieving a good miscibility of components of the resin composition for the optical material by adjusting the compositions (including a copolymerization composition), blend ratio, kneading temperature, kneading pressure, cooling temperature, cooling rate and the like of the resins (a), (b).

The spectral transmittance at 380 nm of the molded article for the optical element of the present invention is preferably 5% or less. A film with a lower spectral transmittance in an ultraviolet region of 380 nm is suitable for an optical film since it can prevent deterioration of a polarizer or a liquid crystal element. The spectral transmittance at 380 nm is further preferably 3% or less, and the spectral transmittance in 380 nm is especially preferably 2.5% or less.

Consequently, in the molded article for the optical element of the present invention, the spectral transmittance at 380 nm is preferably 5% or less, and the absolute value of the photoelastic coefficient at 23° C. is preferably 0 to $4\times10^{-12}$ Pa$^{-1}$. In this case, the absolute value of the photoelastic coefficient at 23° C. is further preferably 0 to $3.5 \times 10^{-12}$ $Pa^{-1}$, especially preferably 0 to $3.0 \times 10^{-12}$ $Pa^{-1}$.

The molded article for the optical element of the present invention can be subjected to a surface functionalization treatment such as an antireflection treatment, a transparency conductive treatment, an electromagnetic wave shielding treatment or a gas barrier treatment, and can preferably be used as a surface functionalized base material.

The molded article of the resin composition for the optical material of the present invention has a high mechanical strength, and can therefore be used as a protective film for any type of optical element. In particular, it is possible to induce an optical anisotropy in the molded article of the resin composition for the optical material of the present invention, and therefore it is preferably used as the polarizer protective film. A case where the molded article for the optical element of the present invention is used as the polarizer protective film will hereinafter be described.

The polarizer protective film of the present invention can be laminated on a polarization film to manufacture a polarizer. In the present invention, it is preferable to laminate a protective film having Re of 10 nm or more on one surface of the polarization film and to laminate a protective film having Re of 10 nm or less on the other surface of the film.

A film with optical isotropy such as triacetyl cellulose is conventionally used for the protective film, as it is used for the protection of a polarization film.

In contrast, in a preferable embodiment of the present invention, a protective film with optical anisotropy is laminated on one surface of the polarization film, and a protective film with optical isotropy is laminated on the other surface of the film. In consequence, the protective film on one surface also serves as an optical anisotropic film, so that an optical anisotropic film such as retarder film made of a polycarbonate resin or a cycloolefin resin conventionally laminated on the protective film of the polarizer can be omitted and a reduced thickness of the polarizer can be achieved.

Moreover, a step of laminating another optical anisotropic film onto the protective film does not need to be carried out, hence leading to better productivity.

Furthermore, Re of the protective film to be laminated on one surface of the polarization film is preferably 10 nm or more, more preferably 20 to 1000 nm, and further preferably 30 to 900 nm.

The protective film to be laminated on one surface with Re of 10 nm or more also has a function of an optical compensation retarder film, ¼ wavelength plate, ½ wavelength plate or another retarder film.

Moreover, it is preferable that Re of the protective film to be laminated on the other surface of the polarization film with optical isotropy is preferably small, and Re is preferably 10 nm or less, more preferably 8 nm or less, and further preferably 5 nm or less.

In the present invention, it is preferable to use a film made of an acrylic resin (d) as the protective film to be laminated on the other surface with optical isotropy.

Specific examples of the acrylic resin (d) are preferably obtained by polymerizing a monomer of one or more selected from the group consisting of alkyl ester of methacrylic acids such as cyclohexyl methacrylate, t-butyl cyclohexyl methacrylate and methyl methacrylate, and alkyl ester of acrylic acids such as methyl acrylate, ethyl acrylate, butyl acrylate, isopropyl acrylate and 2-ethylhexyl acrylate.

Among them, a homopolymer of methyl methacrylate or a copolymer of methyl methacrylate and another monomer is especially preferable.

Examples of a monomer copolymerizable with methyl methacrylate include aromatic vinyl compounds such as another alkyl ester of methacrylic acid, alkyl ester of acrylic acid, styrene, vinyl toluene and α-methyl styrene; vinyl cyanides such as acrylonitrile and methacrylonitrile; maleimides such as N-phenyl maleimide and N-cyclohexyl maleimide; unsaturated carboxylic anhydrides such as maleic anhydride; and unsaturated acids such as acrylic acid, methacrylic acid and maleic acid. They can be used singly or as a combination of two or more of them.

Among these monomers copolymerizable with methyl methacrylate, the alkyl ester of acrylic acid is particularly preferable because it has an excellent thermal decomposition resistance, and a resin methacrylate obtained by the copolymerization of this monomer exhibits a high fluidity during molding.

An amount of the alkyl ester of acrylic acid for use in a case where methyl methacrylate is copolymerized with the alkyl ester of acrylic acid is preferably 0.1% by mass or more from a viewpoint of the thermal decomposition resistance, and preferably 15% by mass or less from a viewpoint of the heat resistance. The amount is further preferably 0.2 to 14% by mass, especially preferably 1 to 12% by mass.

With respect to the alkyl ester of acrylic acid, methyl acrylate and ethyl acrylate are preferable, because even when they are copolymerized with methyl methacrylate in a small amount, the fluidity during molding is remarkably improved.

It is preferable that a mass-average molecular weight of the acrylic resin (d) is 50,000 to 200,000. The mass-average molecular weight is preferably 50,000 or more from a viewpoint of strength of the molded article, and preferably 200,000 or less from the viewpoints of the molding processability and the fluidity. A further preferable range is 70,000 to 150,000. Moreover, in the present invention, an isotactic polymethacrylate ester and a syndiotactic polymethacrylate ester can simultaneously be used.

As a method for manufacturing the acrylic resin (d), any conventional polymerization method such as cast polymerization, bulk polymerization, suspension polymerization, solution polymerization, emulsion polymerization or anion polymerization can be employed. For an optical use application, it is preferable to avoid contamination with micro foreign materials as much as possible, and from this viewpoint, bulk polymerization and solution polymerization, in which a suspending medium or emulsifier is not used, are preferable. Specifically, a method disclosed in Japanese Patent Application Publication No. 63-1964 or the like can be used.

When solution polymerization is carried out, a solution can be formed from a mixture of monomers dissolved in a solvent of an aromatic hydrocarbon such as toluene or ethyl benzene. When the bulk polymerization is carried out, polymerization can be started with free radicals generated by heating or ionizing radiation in a conventional manner.

With respect to an initiator for a polymerizing reaction, any initiator for the radical polymerization can be used. For example, an azo compound such as azobisisobutyl nitrile, or an organic peroxide such as benzoyl peroxide, lauroyl peroxide or t-butylperoxy-2-ethyl hexanoate can be used.

In particular, when the polymerization is carried out at a high temperature of 90° C. or more, the solution polymerization is generally employed. Therefore, a preferred initiator is a peroxide, an azobis initiator or the like which has a half-life period temperature for 10 hours of 80° C. or more and which is soluble in an organic solvent used. Examples of the initiator include 1,1-bis(t-butylperoxy)-3,3,5-trimethylcyclohexane, cyclohexane peroxide, 2,5-dimethyl-2,5-di(benzoylperoxy) hexane, 1,1-azobis(1-cyclohexane carbonitrile), and 2-(carbamoylazo)isobutylonitrile. It is preferable that such an initiator is used within a range of, for example, 0.005 to 5% by mass.

With respect to a molecular weight adjustment agent which is optionally used in the polymerizing reaction, any agent can be used. Especially preferred examples of the molecular weight adjustment agent include mercaptan compounds such as butyl mercaptan, octyl mercaptan, dodecyl mercaptan and 2-ethylhexyl thioglycollate. The molecular weight adjustment agent is added at such a concentration that a polymerization degree of the acrylic resin (d) is controlled within a preferable range.

With respect to the acrylic resin (d) in the present invention, a copolymer obtained by copolymerizing ester methacrylate and/or ester acrylate, the aromatic vinyl compound and a compound represented by the following formula [1] is preferable:

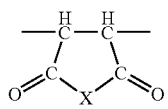

Chemical formula [1]

(wherein X is O or N—R, O is an oxygen atom, N is a nitrogen atom, and R is a hydrogen atom or an alkyl group).

With respect to the ester methacrylate and/or ester acrylate to be copolymerized with the compound represented by the formula [1], methyl methacrylate is preferable. Examples of the aromatic vinyl compound include α-alkyl substituent styrene such as α-methyl styrene and α-methyl-p-methyl styrene, and styrene is preferable.

With respect to the compound represented by the above formula [1], X=O is preferable, that is, maleic anhydride is preferable. Furthermore, from the viewpoints of the heat resistance and the photoelastic coefficient, it is preferable that a methyl methacrylate unit in the copolymer is 40 to 90% by mass, a styrene unit is 5 to 40% by mass, and a maleic acid unit is 5 to 20% by mass, and a ratio of the styrene unit with respect to the maleic acid unit is one to three times. The methyl methacrylate unit in the copolymer is further preferably 40 to 90% by mass, the maleic anhydride unit is 5 to 19% by mass and the styrene unit is 10 to 40% by mass, and the methyl methacrylate unit in the copolymer is especially preferably 45 to 88% by mass, the maleic anhydride unit is 6 to 15% by mass and the styrene unit is 16 to 40% by mass.

A copolymerization ratio of the aromatic vinyl compound unit is preferably 1 time or more and 3 times or less as much as that of the compound unit represented by the chemical formula [8].

The copolymer D1 can include a copolymer obtained by copolymerizing the above-described essential monomer components and another monomer copolymerizable therewith as needed. Examples of the another copolymerizable monomer include unsaturated carboxylic acid monomers such as methacrylic acid, acrylic acid, itaconic acid, maleic acid, fumaric acid and cinnamic acid, unsaturated nitrile monomers such as acrylonitrile and methacrylonitrile; and conjugated dienes such as 1,3-butadiene, 2-methyl-1,3-butadiene (isoprene), 2,3-dimethyl-1,3-butadiene, 1,3-pentadiene and 1,3-hexadiene. It is also possible to carry out the copolymerization while using two or more of these monomers.

As a preparation method of the copolymer D1, bulk polymerization using a radical initiator is suitable, but solution polymerization or emulsion polymerization can also be employed.

Water-based suspension polymerization is not recommended when maleic anhydride is used as a monomer component, because a stable suspension system cannot be maintained constantly owing to high water solubility of maleic anhydride.

Among typical radical initiators, an azo initiator such as azobisisobutyronitrile or 2,2'-azobis(2,4-dimethylvaleronitrile) or a peroxide initiator such as benzoyl peroxide used for preparing the heat resistant acrylic resin sometimes causes coloration of the resulting polymer.

Use of lauroyl peroxide, decanoyl peroxide or t-butylperoxy-2-ethylhexanoate as the peroxide initiator does not cause coloration of the acrylic resin (d). A polymer obtained using t-butylperoxy-2-ethylhexanoate however, has low water resistance and gains weight when immersed in hot water so that it sometimes has a whitened surface.

Use of a diacyl peroxide such as lauroyl peroxide is therefore preferred for polymerization to obtain the acrylic resin (d).

Preferred examples of the polymerization method for the copolymer D1 include a method described in Japanese Patent Publication No. 63-1964.

Further preferred examples of the acrylic resin (d) include a copolymer D2 containing a methacrylate ester and/or acrylate ester unit, an aromatic vinyl compound unit, and a 6-membered-ring-containing unit represented by the following chemical formula [9]. The copolymer D2 having a 6-membered-ring-containing unit is suitable as an optical material because it has excellent heat resistance and at the same time, facilitates the retardation design of a molded article which can made using it.

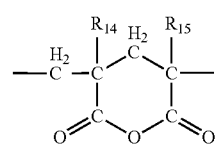

Chemical formula [9]

(wherein, $R_{14}$ and $R_{15}$ each independently represents a hydrogen atom or a substituted or unsubstituted $C_{1-6}$ alkyl group, and if it is a substituted $C_{1-6}$ alkyl group, it may be substituted, for example, with a hydroxyl group).

With respect to the methacrylate ester and/or acrylate ester serving as the first monomer component of the copolymer D2, specific examples of the esters as described above in the acrylic resin (d) can be employed. With respect to the methacrylate ester, butyl methacrylate, ethyl methacrylate, methyl methacrylate, propyl methacrylate, isopropyl methacrylate, cyclohexyl methacrylate, phenyl methacrylate, (2-ethylhexyl)methacrylate, (t-butylcyclohexyl)methacrylate, benzyl methacrylate and (2,2,2-trifluoroethyl)methacrylate are especially preferred. Of these, methyl methacrylate is a typical example.

With respect to the acrylate ester, methyl acrylate, ethyl acrylate, butyl acrylate, isopropyl acrylate, cyclohexyl acrylate, phenyl acrylate, (2-ethylhexyl)acrylate, (t-butylcyclohexyl)acrylate, benzyl acrylate and (2,2,2-trifluoroethyl) acrylate are preferred.

The above-described methacrylate esters and acrylate esters may be used either singly or in combination of two or more thereof.

In considering the balance among heat resistance, optical characteristics and the like of the copolymer D2, an amount of the methacrylate ester and/or acrylate ester is preferably 5 parts by mass or more and 85 parts by mass or less, more preferably 20 parts by mass or more and 80 parts by mass or less, still more preferably 40 parts by mass or more and 80 parts by mass or less assuming that total amount of the monomer components provided for polymerization is 100 parts by mass.

With respect to specific examples of the aromatic vinyl compound serving as the second monomer component of the copolymer D2, those given as examples in the above description of the copolymer B can be employed. Especially preferred is a compound represented by the following chemical formula [10]:

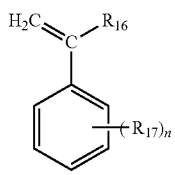

Chemical formula [10]

(wherein, $R_{16}$ represents a hydrogen atom or a substituted or unsubstituted $C_{1-6}$ alkyl group, and when it is a substituted $C_{1-6}$ alkyl group, it may have, for example, a hydroxyl group as a substituent; n is an integer from 0 to 5; and $R_{17}$s may be the same or different and each independently represents a group selected from a hydrogen atom, substituted or unsubstituted $C_{1-12}$ alkyl groups, substituted or unsubstituted $C_{1-12}$ alkoxy groups, and substituted or unsubstituted $C_{1-8}$ aryl groups, or $R_{17}$s may be coupled together to form a ring structure).

Specific examples of the compound represented by the chemical formula [10] include styrene monomers such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene and isopropenylbenzene (α-methylstyrene); 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene. A suitable compound can be selected as needed, depending on the properties which the copolymer is required to have. Of these, the styrene monomers are preferred, of which styrene and isopropenylbenzene are more preferred and styrene is still more preferred.

The above-described aromatic vinyl compounds may be used either singly or in combination of two or more thereof.

The charged amount of the aromatic vinyl compound can be determined as needed, depending on the optical characteristics, heat resistance and processing properties which Copolymer D2 is required to have. In view of the productivity and the like, the amount of the aromatic vinyl compound is preferably 1 part by mass or more and 50 parts by mass or less, more preferably 3 parts by mass or more and 40 parts by mass or less, still more preferably 3 parts by mass or more and 30 parts by mass or less, especially preferably 3 parts by mass or more and 25 parts by mass or less, most preferably 5 parts by mass or more and 20 parts by mass or less, assuming that the total amount of the monomer components used upon polymerization are 100 parts by mass.

The 6-membered-ring-containing unit of the chemical formula [9] serving as the third unit of the copolymer D2 can be prepared by polymerizing an unsaturated carboxylic acid monomer and, optionally an unsaturated alkyl carboxylate monomer, and another monomer component, heating the resulting copolymer in the presence or absence of an appropriate catalyst to cause an intramolecular cyclization reaction due to dealcoholization and/or dehydration. In this case, an acid anhydride unit having a 6-membered-ring structure is formed by heating the copolymer, thereby causing dehydration from the carboxyl groups of two unsaturated carboxylic acid units or dealcoholization from the unsaturated carboxylic acid unit and unsaturated alkyl carboxylate unit adjacent to each other.

Specific examples of the unsaturated carboxylic acid monomer for forming the 6-membered-ring-containing unit represented by the chemical formula [9] include compounds represented by the following chemical formula [11]:

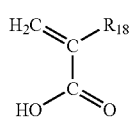

Chemical formula [11]

(wherein, $R_{18}$ represents a hydrogen atom or a substituted or unsubstituted $C_{1-6}$ alkyl group and when it is a substituted $C_{1-6}$ alkyl group, it may have, for example, a hydroxyl group).

Examples of the unsaturated carboxylic acid monomer for forming the 6-membered-ring-containing unit include methacrylic acid, acrylic acid, itaconic acid, maleic acid, fumaric acid and cinnamic acid, while those of the unsaturated carboxylic acid alkyl ester monomer include methyl methacrylate and methyl acrylate. Methacrylic acid and acrylic acid are used preferably and methacrylic acid is used more preferably.

These unsaturated carboxylic acids may be used either singly or in combination of two or more thereof.

In considering heat resistance, processing properties, light characteristics, productivity and the like which the copolymer D2 is required to have, the charged amount of the unsaturated carboxylic acid monomer is preferably 1 part by mass or more and 50 parts by mass or less, more preferably 5 parts by mass or more and 40 parts by mass or less, still more preferably 10 parts by mass or more and 40 parts by mass or less, still more preferably 10 parts by mass or more and 35 parts by mass or less, especially preferably 15 parts by mass or more and 35 parts by mass or less, and most preferably 20 parts by mass or more and 30 parts by mass or less, assuming that total amount of the monomer components used upon polymerization is 100 parts by mass.

The copolymer D2 may include a copolymer obtained by copolymerizing the above-described monomer components, which are essential constituent units, with another monomer as long as the advantage of the present invention is not compromised. With respect to the another monomer which can be used here, vinyl monomers other than the monomer which is an essential constituent unit can be used. Examples of the vinyl monomer which can be used as the another monomer include vinyl cyanides such as acrylonitrile and methacrylonitrile; unsaturated carboxylic anhydrides such as maleic anhydride and itaconic anhydride; maleimides such as N-methylmaleimide, N-ethylmaleimide, N-phenylmaleimide and N-cyclohexylmaleimide; and amides such as acrylamide and methacrylamide.

When the copolymer D2 contains the another monomer, the charged amount of the monomer is preferably from 0.1 to 50 parts by mass, more preferably from 0.1 to 40 parts by mass, still more preferably from 0.5 to 35 parts by mass, still more preferably from 1 to 30 parts by mass, especially preferably 1 to 25 parts by mass, assuming that total amount of the monomers used upon polymerization is 100 parts by mass, considering the optical characteristics, heat resistance and processing properties of the copolymer D2.

Determination of a composition ratio, preparation and evaluation of the copolymer D2 can be performed with reference to the methods described in Japanese Patent Publication No. 02-26641, Japanese Patent Application Laid-Open No. 2006-266543, Japanese Patent Application Laid-Open No. 2006-274069, Japanese Patent Application Laid-Open No. 2006-274071, Japanese Patent Application Laid-Open No. 2006-283013, and Japanese Patent Application Laid-Open No. 2005-162835.

With respect to a polymerization method for the copolymer D2, any conventional polymerization method such as bulk polymerization, solution polymerization, emulsion polymerization, suspension polymerization and precipitation polymerization can be employed. Bulk polymerization, solution polymerization and precipitation polymerization using no suspending agent or emulsifying agent are preferred because they enable reduction of micro foreign matters mixed in the product. In view of productivity, such as ease of control of molecular weight, bulk polymerization and solution polymerization are preferred.

A solvent can be used in preparing the copolymer D2. The most suitable solvent may be arbitrarily selected depending on the polymerization method. Specific examples include aromatic hydrocarbons such as toluene, xylene and ethylbenzene; alcohols such as methanol, ethanol and cyclohexanol; ketones such as acetone, methyl ethyl ketone, methyl isobutyl ketone and diisobutyl ketone; hydrocarbons such as pentane, hexane, heptane and cyclohexane; and esters such as ethyl acetate and butyl acetate. They may be used either singly or in combination of two or more thereof.

In preparing the copolymer D2, particularly, by solution polymerization or bulk polymerization, precipitation of the resulting copolymer may occur and disturb the stable operation when the solubility of the copolymer in a solvent is low. It is therefore preferred to take into account the solubility of the copolymer in a solvent in selecting the solvent. Described specifically, the solvent to be used has a solubility parameter δ of preferably from 9.0 to 15.0 $(cal/cm^3)^{1/2}$, more preferably from 9.2 to 14.0 $(cal/cm^3)^{1/2}$, still more preferably from 9.3 to 13.5 $(cal/cm^3)^{1/2}$, still more preferably from 9.4 to 13.0 $(cal/cm^3)^{1/2}$, especially preferably from 9.7 to 12.8 $(cal/cm^3)^{1/2}$. With regard to a solubility parameter and determination method thereof, K. L. Hoy, "New Values of the Solubility Parameters From Vapor Pressure Data" submitted to *Journal of Paint Technology*, 42(541), February, 76-118 (1970) and J. Brandrup, et al., *Polymer Handbook Fourth Edition*, P-VII/675-p714 can be used as reference. It should be noted that 1 $(cal/cm^3)^{1/2}$ is approximately 0.49 $(MPa)^{1/2}$.

When a hydroxyl-free solvent such as aromatic hydrocarbon or ketone is used for the preparation of the copolymer D2, the polymerization degree of the copolymer cannot always be raised because operation at a practically useful polymerization rate during preparation of the copolymer is accompanied by precipitation of high molecular weight components which tends to disturb the control of molecular weight or molecular weight distribution. In particular, the precipitation of high molecular weight components tends to occur when a feed ratio of the unsaturated carboxylic acid monomer is 15% by mass or more. When productivity is an important factor in the preparation of the copolymer, it is preferable to use a solvent having at least one hydroxyl group and represented by the following chemical formula [12]:

$$R_{19}\text{—OH} \qquad \text{Chemical formula [12]}$$

(wherein, $R_{19}$ represents a substituted or unsubstituted $C_{1-15}$ alkyl group and $R_{19}$ may be substituted with, for example, a hydroxyl group or may contain an ether bond).

The unsaturated carboxylic acid monomer has high polymerizability so that if a polymerization inhibitor is not added or is added in a small amount, self polymerization may occur at a temperature from normal temperature to high temperature. The solvent or monomer collected from the reaction system is sometimes subjected to a separation operation through a rectification column and is then recycled. The unsaturated carboxylic acid monomer highly polymerized in the rectification column can not be recycled and moreover, can cause damage of the apparatus owing to the precipitation and solidification of the resulting polymer. It is therefore preferred to use a solvent having at least one hydroxyl group when the monomer and solvent are collected from the reaction system and are recycled.

Specific examples of such a solvent having at least one hydroxyl group include alcohols having a hydroxyl group such as methanol, ethanol, propanol, butanol, pentanol, hexanol, heptanol, capryl alcohol, lauryl alcohol, myristyl alcohol, cyclopentanol, cyclohexanol, cycloheptanol, 2-methylcyclohexanol, 3-methylcyclohexanol, 4-methylcyclohexanol, 2-ethylcyclohexanol, 3-ethylcyclohexanol, 4-ethylcyclohexanol, 2,3-dimethylcyclohexanol, 2,4-dimethylcyclohexanol, 2,5-dimethylcyclohexanol, 2,6-dimethylcyclohexanol, 3,4-dimethylcyclohexanol, and 3,5-dimethylcyclohexanol; alcohols having a plurality of hydroxyl groups such as ethylene glycol and glycerin; and alcohols having an ether bond such as methyl cellosolve.

Of these, secondary alcohols are preferred, of which alcohols having a cyclic structure are more preferred. Above all, cyclohexanol shows excellent miscibility with the unsaturated carboxylic acid monomer and is especially preferred from the viewpoint of preventing metal corrosion (preventing corrosion of pipes of apparatuses used in a step of collecting a recycled solution of the polymerization solution or apparatuses used for polymerization or recycling) caused by the unsaturated carboxylic acid monomer which is an organic acid.

A water content in the solvent to be used for the preparation of the copolymer D2 is preferably 5% by mass or less, more preferably 3% by mass or less, still more preferably from 0.01 to 2% by mass, especially preferably from 0.1 to 2% by mass.

The unsaturated carboxylic acid monomer tends to have a higher boiling point than acrylate ester monomers or aromatic vinyl compound monomers and it may remain at a high concentration on the bottom of the rectification column during a separation operation of the recycle solution. Self polymerization of the unsaturated carboxylic acid monomer proceeds on the bottom of the rectification column and may possibly impair the recycle property of the monomer, solvent or the like. As described above, use of a solvent having at least one hydroxyl group may decrease the self polymerization of the unsaturated carboxylic acid monomer. For higher improvement of the recycle property, the solvent has a boiling point of preferably 100° C. or more, more preferably 100° C. or more and 200° C. or less, still more preferably 110° C. or more and 200° C. or less, especially preferably 120° C. or more and 190° C. or less, most preferably 130° C. or more and 190° C. or less.

Moreover, a difference between a boiling point (X) of a monomer having the highest boiling point among the monomers used and a boiling point (Y) of the solvent used (X−Y (° C.)) satisfies preferably the following equation: −50° C.≦(X−Y)≦40° C., more preferably the following equation: −40° C.≦(X−Y)≦30° C., still more preferably −40° C.≦(X−Y)≦20° C., still more preferably −30° C.≦(X−Y)≦20° C., especially preferably −25° C.≦(X−Y)≦15° C., most preferably −15° C.≦(X−Y)≦10° C.

When solution polymerization or bulk polymerization is employed for the preparation of the copolymer D2, a solubility of the copolymer D2 in the solvent is preferably 0.1 g/100 mL or more, more preferably, more preferably 1 g/100 mL, still more preferably 2 g/100 mL or more.

In considering the potential for corrosion of pipes of apparatuses used in the collecting step of a recycle solution of the polymerization solution or apparatuses used for polymerization or recycling, solubility of the solvent in water is preferably 0.7 g/100 mL or more and 10 g/100 mL or less, more preferably 1.0 g/100 mL or more and 80 g/100 mL or less, more preferably 1.0 g/100 mL or more and 50 g/100 mL or less, still more preferably 1.0 g/100 mL or more and 25 g/100 mL or less, especially preferably 1.0 g/100 mL or more and 15 g/100 mL or less, most preferably 1.0 g/100 mL or more and 10 g/100 mL or less.

Too large of an amount of the solvent to be used upon preparation of the copolymer D2 decreases the concentration of the monomers in the polymerization solution, leading to reduction in productivity. Too small of an amount, on the other hand, increases the viscosity of the polymerization solution, which requires treatment for raising the temperature of the polymer solution or the like and may increase production cost. Although the amount of the solvent can be determined arbitrarily on the condition that the polymerization proceeds, in view of the potential decreased productivity and/or increased production costs, the solvent amount is preferably 5% by mass or more and 60% by mass or less, more preferably 5% by mass or more and 50% by mass or less, still more preferably 10% by mass or more and 45% by mass or less, especially preferably 15% by mass or more and 40% by mass or less, supposing that a total of all the monomer components and the solvent is 100% by mass.

The polymerization temperature in the preparation of the copolymer D2 may be any temperature on the condition that the polymerization proceeds at the temperature. From a viewpoint of productivity, the polymerization temperature is preferably 50° C. or more and 200° C. or less, more preferably 90° C. or more and 200° C. or less, still more preferably 100° C. or more and 200° C. or less, still more preferably 100° C. or more and 180° C. or less, still more preferably 110° C. or more and 170° C. or less, especially preferably 120° C. or more and 160° C. or less. There is no special limitation on the polymerization time as long as a required degree of polymerization can be achieved. From a viewpoint of productivity and the like, the polymerization time is preferably 0.5 hour or more and 6 hours or less, more preferably 1 hour or more and 5 hours or less, still more preferably 1 hour or more and 3 hours or less.

During the preparation of the copolymer D2, a dissolved oxygen concentration in the polymerization solution is preferably 10 ppm or less. The dissolved oxygen concentration can be measured, for example, using a dissolved oxygen analyzer "DO Analyzer B-505" (manufactured by Iijima Electronics Co., Lyd.). In order to reduce a dissolved oxygen concentration, any appropriate method such as bubbling an inert gas through the polymerization solution, repeatedly applying and releasing pressure to approximately 0.2 MPa on the polymerization solution in a container containing the polymerization solution before initiation of the polymerization, feeding the container containing the polymerization solution with an inert gas, and the like can be selected.

With respect to a molecular weight distribution of the copolymer D2, a ratio (Mw/Mn) of weight average molecular weight (Mw) to number average molecular weight (Mn) falls within a range of preferably from 1.5 to 3.0, more preferably from 1.6 to 2.7, still more preferably from 1.6 to 2.4, from the viewpoints of fluidity during molding and mechanical strength.

In the present invention, the ratio (Mw/Mn) of weight average molecular weight (Mw) to number average molecular weight (Mn) is a value relative to PMMA standards determined by using gel permeation chromatography (GPC).

The weight average molecular weight (Mw) of the copolymer D2 as measured by GPC is preferably from 50000 to 300000, more preferably from 50000 to 250000, still more preferably from 70000 to 220000, especially preferably from 80000 to 200000 from the viewpoint of a good balance among fluidity, heat resistance, stretching stability and the like.

As described above, the 6-membered-containing unit of the copolymer D2 represented by the chemical formula [9] is available by polymerizing the unsaturated carboxylic acid monomer, optionally the unsaturated carboxylate ester monomer, and another monomer component into the corresponding copolymer; and heating the resulting copolymer in the presence or absence of a catalyst to cause an intramolecular cyclization reaction by a dehydration reaction from the unsaturated carboxylic acid monomer units or a dealcoholization reaction from the unsaturated carboxylic acid monomer unit and unsaturated carboxylate ester unit (more specifically, a methacrylate ester and/or acrylate ester unit, or the like).

There is no special limitation on the method of causing such an intramolecular cyclization reaction. For example, a method of using an extruder equipped with a vent port and a method using a devolatilization tank in an inert gas atmosphere such as nitrogen or argon or under reduced pressure, can be employed.

Examples of an apparatus for causing the intramolecular cyclization reaction include a flush tank, twin-screw extruder, single-screw extruder, twin-screw/single-screw complex type continuous kneading extruder, multi-screw extruder having at least three screws, and kneader. They may be used either singly or in combination of two or more thereof.

When the intramolecular cyclization reaction is caused by devolatilization under heat, the temperature can arbitrarily be set depending on the desired composition of the copolymer, an amount of unreacted monomers, or an amount of the solvent. There is no special limitation on the temperature as long as the intramolecular cyclization reaction occurs at the required temperature. The temperature is preferably from 180 to 300° C., more preferably from 200 to 300° C., still more preferably from 200 to 280° C., especially preferably from 220 to 280° C.

Heating time for devolatilization under heat and/or cyclization reaction can arbitrarily be set depending on the desired composition of the copolymer. The heating time is generally from 1 to 240 minutes, preferably from 1 to 150 minutes, more preferably from 1 to 120 minutes, still more preferably from 2 to 90 minutes, especially preferably from 3 to 60 minutes, most preferably from 5 to 60 minutes.

When the extruder is employed, in order to satisfy the necessary heating time, it is preferred to adjust a ratio (L/D) of a screw length (L) to a screw diameter (D) to 20 or more, more preferably 30 or more, especially preferably 40 or more. An extruder having an L/D not more than 120 is suitable for practical use.

When devolatilization under heat and/or cyclization reaction is performed under reduced pressure, the pressure is preferably 200 Torr or less, more preferably 150 Torr or less, still more preferably 100 Torr or less, especially preferably 50 Torr or less in consideration of the devolatilization efficiency. The pressure is preferably 1 Torr or more for practical use.

In forming the 6-membered-ring-containing unit represented by the chemical formula [9] in the copolymer D2, at least one catalyst selected from acids, alkalis and salts can be added to accelerate the cyclization reaction. Although there is no special limitation on the amount of the cyclizing catalyst as long as it does not impair the object of the present application, it is preferably as small as possible taking into consideration the clarity and mechanical strength of the copolymer thus obtained. More specifically, the amount of cyclizing catalyst is preferably 1 part by mass or less, more preferably 0.5 part by mass, still more preferably 0.1 part by mass.

Examples of the preferred catalyst include acid catalysts such as hydrochloric acid, sulfuric acid, phosphoric acid, phosphorous acid, p-toluenesulfonic acid, and phenylphosphonic acid, basic catalysts such as metal hydroxides, amines, imines, alkali metal derivatives and alkaline earth metal derivatives, and salt catalysts such as metal carbonates, metal sulfates, metal acetates, and metal stearates.

These basic catalysts and salt catalysts can be used preferably from the viewpoints of acceleration effects of the cyclization reaction, and clarity and coloration of the copolymer. The above-described cyclization catalysts may be used either singly or in combination of two or more thereof.

There is no special limitation on the copolymerization ratio of each unit of the copolymer D2 as long as the advantages of the present invention can be achieved. When a good balance between heat resistance and optical characteristics of the copolymer is required, the copolymerization ratio of the methacrylate ester and/or acrylate ester monomer unit is preferably 5% by mass or more and 85% by mass or less, more preferably 20% by mass or more and 80% by mass or less, still more preferably 40% by mass or more and 80% by mass or less, still more preferably 50% by mass or more and 80% by mass or less. The copolymerization of the 6-membered-ring-containing unit represented by the chemical formula [9] is preferably 10% by mass or more and 35% by mass or less, more preferably 15% by mass or more and 33% by mass or less, still more preferably 17% by mass or more and 30% by mass or less, still more preferably 17% by mass or more and 28% by mass or less, especially preferably 17% by mass or more and less than 25% by mass. The copolymerization ratio of the aromatic vinyl compound unit is preferably 2% by mass or more and 50% by mass or less, more preferably 4% by mass or more and 45% by mass or less, still more preferably 4% by mass or more and 30% by mass or less, still more preferably 5% or mass and 25% by mass or less, especially preferably 5% by mass or more and 20% by mass or less.

Moreover, when the copolymer D2 contains the unsaturated carboxylic acid monomer unit, the copolymerization ratio of it is preferably 10% by mass or less, more preferably 1% by mass or greater and 10% by mass or less, still more preferably 1% by mass or more and 8% by mass or less, especially preferably 2% by mass or more and 7% by mass or less.

It is preferred that in view of the balance among heat resistance, fluidity, processing properties, mechanical properties and optical characteristics, a ratio (% by mass) of the copolymerization ratio of the 6-membered-ring-containing unit represented by the chemical formula [9] to that of the unsaturated carboxylic acid monomer unit satisfies the following equation: $2 \leq$ the copolymerization ratio of the 6-membered-ring-containing unit represented by the chemical formula [9]/the copolymerization ratio of the unsaturated carboxylic acid monomer unit $\leq 30$.

In particular, when it is necessary to achieve a good balance among optical characteristics such as photoelastic coefficient and retardation, heat resistance and fluidity during molding, a ratio of the copolymerization ratio of the 6-membered-ring-containing unit represented by the chemical formula [9] to that of the unsaturated carboxylic acid monomer unit satisfies the following equation: $1 \leq$ the copolymerization ratio of the aromatic vinyl compound unit/the copolymerization ratio of the unsaturated carboxylic acid monomer unit $\leq 10$.

The copolymerization ratio of each unit of the copolymer D2 can be typically determined by NMR, infrared spectrometer, neutralization titration, or the like.

In preparing the copolymer D2, a polymerization initiator may be added in order to adjust the polymerization degree. Examples of the polymerization initiator for radical polymerization usable in the present invention include such as organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, 1,1-bis(t-butylperoxy)cyclohexane, cyclohexane peroxide, and 2,5-dimethyl-2,5-di(benzoylperoxy)hexane; and typical azo type radical polymerization initiators such as azobisisobutyronitrile, azobisisovaleronitrile, 1,1'-azobis(1-cyclohexanecarbonitrile), 2,2'-azobis-4-methoxy-2,4-azobisisobutyronitrile, 2,2'-azobis-2,4-dimethylvaleronitrile and 2,2'-azobis-2-methylbutyronitrile. They may be used either singly or in combination of two or more thereof. These radical initiators and an appropriate reducing agent may be used in combination as a redox initiator. These initiators can arbitrarily be selected depending on the temperature at which polymerization is performed and a half-life of the initiator.

In particular, when polymerization is performed at high temperatures of 90° C. or more, solution polymerization is generally employed so that it is preferred to use a peroxide or azobis initiator which has a 10-hour half-life temperature of 80° C. or more and is soluble in an organic solvent to be employed. Specific examples of such an initiator include 1,1-bis(t-butylperoxy)-3,3,5-trimethylcyclohexane, cyclohexane peroxide, 2,5-dimethyl-2,5-di(benzoylperoxy)hexane, 1,1'-azobis(1-cyclohexanecarbonitrile) and 2-(carbamoylazo)isobutylonitrile.

Such an initiator is employed preferably, for example, in an amount ranging from 0 to 1 part by mass with respect to 100 parts by mass of the whole monomer mixture.

When solution polymerization is employed, the type and amount of the polymerization initiator may be arbitrarily determined to give its solid content, in the polymerization solution, of from 10 to 60% by mass considering the viscosity of the polymerization solution or the like.

In preparing the copolymer D2, its molecular weight can be controlled as long as the object of the present invention can be achieved. For example, the molecular weight can be regulated by adding, for example, a chain transfer agent such as alkylmercaptan, dimethylacetamide, dimethylformamide or triethylamine or an iniferter such as dithiocarbamate, triphenylmethylazobenzene or tetraphenylethane derivative. The molecular weight can be regulated by adjusting the amount of such an additive. Alkyl mercaptans are suitable as the additive when considering handling ease and stability. Specific examples of alkyl mercaptans include n-butyl mercaptan, n-octyl mercaptan, n-dodecyl mercaptan, t-dodecyl mercaptan, n-tetradecyl mercaptan, n-octadecyl mercaptan, 2-ethylhexyl thioglycolate, ethylene glycol dithioglycolate, trimethylolpropane tris(thioglycolate), and pentaerythritol tetrakis(thioglycolate).

Such a molecular weight regulating agent may be arbitrarily added to regulate the molecular weight of the copolymer D2 to a desired value. It is added generally in an amount ranging from 0.001 parts by mass to 3 parts by mass with respect to 100 parts by mass of the whole monomer mixture.

Examples of another molecular weight regulating method include a method of changing the polymerization method, a method of controlling the amount of the polymerization initiator, and a method of changing the polymerization temperature.

These molecular weight regulating methods may be used either singly or in combination of two or more thereof.

In the present invention, two or more types of the copolymers D2 which are different in composition, molecular weight, or the like may be used in combination.

From the viewpoint of the strength of the molded article, it is preferable that a melt index (ADTM D1238; I condition) of the acrylic resin (d) for use in the present invention is 10 g/10 minutes or less. The index is more preferably 6 g/10 minutes or less, more preferably 3 g/10 minutes or less.

The acrylic resin (d) may include a fatty polyester resin (e).

Examples of the fatty polyester resin (e) include a polymer comprising fatty hydroxycarboxylic acid as a main constituting component, and a polymer comprising fatty polycarboxylic acid and fatty polyhydric alcohol as main constituting components.

Examples of the polymer comprising fatty hydroxycarboxylic acid as the main constituting component include poly-glycolic acid, poly lactic acid, poly 3-hydroxybutyric acid, poly 4-hydroxybutyric acid, poly 4-hydroxyvaleric acid, poly 3-hydroxyhexanoic acid, and poly caproic lactone. Examples of the polymer comprising fatty polycarboxylic acid and fatty polyhydric alcohol as the main constituting components include polyethylene adipate, polyethylene succinate, polybutylene adipate, and polybutylene succinate. The fatty polyester resin (e) may be used singly or in combination of two or more thereof.

Among these fatty polyester resins (e), the polymer comprising hydroxycarboxylic acid as the main constituting component is preferable, and a polylactic resin is especially preferably used. One or more of these (e) components may be used.

Examples of the polylactic resin include a polymer comprising L-lactic acid and/or D-lactic acid as the main constituting component.

In the polylactic resin, regarding a molar ratio between an L-lactic acid unit and a D-lactic acid unit, the polymer comprises preferably 85% or more, more preferably 90% or more, further preferably 94% or more of either an L-article or a D-article with respect to a total of 100% of the L-article and the D-article. In the present invention, poly L-lactic acid mainly composed of the L-lactic acid and poly D-lactic acid mainly composed of the D-lactic acid may be used in combination.

The polylactic resin includes a comonomer copolymerized with a lactic derivative monomer other than the L-article and the D-article, or another component copolymerizable with lactide, and examples of such a component include dicarboxylic acid, polyhydric alcohol, hydroxycarboxylic acid, and lactone. The polylactic resin may be polymerized by a known polymerization process such as direct dehydration condensation or ring opening polymerization of lactide. If necessary, the resin may highly molecularly be polymerized using a bonding agent such as polyisocyanate.

A preferable mass-average molecular weight of the polylactic resin is preferably 30,000 or more from a viewpoint of mechanical properties, more preferably 1000,000 or less from a viewpoint of processing properties. The mass average molecular weight is further preferably 50,000 to 500,000, most preferably 100,000 to 280,000.

Moreover, the polylactic resin may comprise 1 to 30% by mass of a copolymer component other than lactic acid in such an amount so long as the object of the present invention is not impaired. Examples of another copolymer component unit include polycarboxylic acid, polyhydric alcohol, hydroxycarboxylic acid, and lactone. Examples of the component include polycarboxylic acids such as oxalic acid, succinic acid, glutaric acid, adipic acid, azelaic acid, sebacic acid, dodecandionic acid, fumaric acid, cyclohexane carboxylic acid, terephthalic acid, isophthalic acid, phthalic acid, 2,6-naphthalen dicarboxylic acid, 5-sodium sulfoisophthalic acid, and 5-tetrabutyl phosphonium sulfoisophthalic acid; polyhydric alcohols such as ethylene glycol, propylene glycol, butane diol, heptane diol, hexane diol, octane diol, nonane diol, decane diol, 1,4-cyclohexane dimethanol, neopentyl glycol, glycerin, trimethylol propane, pentaerythritol, bisphenol A, aromatic multivalent alcohol obtained by an additional reaction of bisphenol with ethylene oxide, diethylene glycol, triethylene glycol, polyethylene glycol, polypropylene glycol, and polytetra methylene glycol; hydroxycarboxylic acids such as glycolic acid, 3-hydroxybutyric acid, 4-hydroxybutyric acid, 4-hydroxyvaleric acid, 6-hydroxy caproicacid, and hydroxylbenzoic acid; and lactones such as glycolide, ε-caprolactone glycolide, ε-caprolactone, β-propiolactone, δ-butyrolactone, β- or γ-butyrolactone, pivarolactone, and δ-valerolactone. These copolymer components may be used singly or in combination of two or more thereof.

With respect to the manufacturing method of the fatty polyester resin (e), a known polymerization method may be used, and especially with regard to the polylactic resin, a direct polymerization process from lactic acid, a ring opening polymerization process via lactide, or the like can be employed.

In the present invention, an amount (parts by mass) of acrylic resin (d) in the resin composition constituted of the acrylic resin (d) and the fatty polyester resin (e) is preferably 0.1 to 99.9 parts by mass, further preferably 50 to 99.9 parts by mass, especially preferably 60 to 95 parts by mass with respect to a total of 100 parts by mass of the acrylic resin (d) and the fatty polyester resin (e) in consideration of the photoelastic coefficient, strength, heat resistance and Hayes value. The amount is preferably 50 parts by mass or more, as the Hayes value decreases when the material is subjected to humidity and heat. An optical material with a small Hayes value or a small Hayes change can preferably be used for a display application or the like.

The amount (parts by mass) of the fatty polyester resin (e) is preferably 0.1 to 99.9 parts by mass, further preferably 0.1 to 50 parts by mass, especially preferably 5 to 40 parts by mass with respect to a total of 100 parts by mass of the acrylic resin (d) and the fatty polyester resin (b), in consideration of the photoelastic coefficient, strength, heat resistance and Hayes value. When the amount is 50 parts by mass or less, the Hayes value favorably decreases in an atmosphere with high humidity and heat. Optical material with a small Hayes value, or small Hayes value change can preferably be used for the display application.

With respect to the protective film to be laminated on the other surface of the polarization film of the present invention, resin other than the acrylic resin (d) and aliphatic polyester resin (e) can be added as long as the advantages of the present invention are not compromised. Examples of the another resin include polyolefins such as polyethylene and polypropylene; thermoplastic resins such as polyamide, polypheylene sulfide, polyether ether ketone, polyester, aliphatic polyester resin, polysulfone, polyphenylene oxide, polyimide, polyether imide and polyacetal; and thermosetting resins such as phenol resin, melamine resin, silicone resin and epoxy resin. One or more of these resin components can be used.

When the resin other than the acrylic resin (d) and aliphatic polyester resin (e), is incorporated in the protective film to be laminated on the other surface of the polarization film of the present invention, its amount is preferably 20 parts by mass or less, more preferably 10 parts by mass with respect to 100 parts by mass of a total of the acrylic resin (d) and the aliphatic polyester resin (e).

An ultraviolet absorbent can be incorporated in the protective film to be laminated on the other surface of the polarization film of the present invention as long as the advantages of the present invention are not compromised.

Examples of the ultraviolet absorbent to be incorporated include benzotriazole compounds, benzotriazine compounds, benzoate compounds, benzophenone compounds, oxybenzophenone compounds, phenol compounds, oxazole compounds, malonate ester compounds, cyanoacrylate compounds, lactone compounds, salicylate ester compounds, benzoxazinone compounds, hindered amine compounds and triazine compounds.

Of these, benzoriazole compounds, benzotriazine compounds, benzoate compounds, benzophenone compounds, phenol compounds, oxazole compounds, malonate ester compounds, and lactone compounds are preferred because they are effective for reducing the absolute value of a photoelastic coefficient of the resin composition to which they are added. Of these, benzotriazole compounds and benzotriazine compounds are most preferred. They may be used either singly or in combination.

The ultraviolet absorbent having a vapor pressure (P) at 20° C. of $1.0 \times 10^{-4}$ Pa or less is preferred because its molding properties are excellent. The vapor pressure (P) within a range of $1.0 \times 10^{-6}$ Pa or less is more preferred and a vapor pressure (P) within a range of $1.0 \times 10^{-8}$ Pa or less is especially preferred. The phrase "molding properties are excellent" means, for example, that the adhesion of the ultraviolet absorbent to a roll occurs less frequently during film formation. When the ultraviolet absorbent adheres to the roll, it adheres, for example, to the surface of a molded article and deteriorates the appearance and optical characteristics of it. Such a molded article is undesirable as an optical material.

The ultraviolet absorbent having a melting point (Tm) of 80° C. or more is preferred, because it has excellent molding properties. The melting point (Tm) is more preferably 130° C. or more, especially preferably 160° C. or more.

The ultraviolet absorbent having a weight loss ratio of 50% or less when heated at a rate of 20° C./min from 23° C. to 260° C. is preferred, because it has excellent molding properties. The weight loss ratio is more preferably 15% or less, especially preferably 2% or less.

The protective film to be laminated on the other surface of the polarization film of the present invention has preferably a spectral transmittance at 380 nm of 5% or less, and a spectral transmittance at 400 nm of 65% or more. Spectral transmittance at 380 nm, which is an ultraviolet region, is smaller, and deterioration of a polarizer or liquid crystal element can be protected. In comparison, the spectral transmittance at 400 nm which is a visible region, is higher, and color reproducibility is excellent. A protective film within the above-described range can therefore be used preferably as an optical film. The spectral transmittance of the film can be designed to fall within the above-described range preferably by adding the ultraviolet absorbent in an amount of 0.1% by mass or more and 10% by mass or less. When the amounts exceeds 0.1% by mass, the spectral transmittance at 380 nm is small, while when the amounts is less than 10% by mass, the photoelastic coefficient increases less and improves the molding properties and mechanical strength. Amounts within the above-described range are therefore preferred. The amount of the ultraviolet absorbent is more preferably 0.3% by mass or more and 8% by mass or less, still more preferably 0.5% by mass or more and 5% by mass or less.

The amount of the ultraviolet absorbent can be determined based on the ratio of integral values of peak signal areas of proton NMR obtained by a nuclear magnetic resonance apparatus (NMR), or it can be determined by gas chromatography (GC) after extracting the ultraviolet absorbent from the resin by using a good solvent.

Any additive can be incorporated, depending on various purposes, in the protective film to be laminated on the other surface of the polarization film of the present invention as long as the object of the present invention can be achieved. There is no special limitation on the additive to be incorporated in the protective film as long as it is incorporated generally in a resin or elastomeric polymer.

Examples of such an additive include inorganic fillers such as silicon dioxide; pigments such as iron oxide; lubricants or release agents such as stearic acid, behenic acid, zinc stearate, calcium stearate, magnesium stearate, and ethylene bis-stearoamide; softening agents/plasticizers such as paraffinic process oils, naphthenic process oils, aromatic process oils, paraffin, organopolysiloxanes, and mineral oils; antioxidants such as hindered phenol antioxidant, acrylate-containing phenol antioxidant, and phosphorus-based heat stabilizer; hindered amine light stabilizers; flame retardants; antistatics; reinforcing agents such as organic fibers, glass fibers, carbon fibers and metal whiskers; and colorants.

In the present invention, the thickness of the protective film is preferably 0.1 µm or more when considering handling, and preferably 300 µm or less when considering miniaturization requirements in the technical field. For similar reasons, a range of 0.2 to 250 µm is further preferable, and a range of 0.3 to 200 µm is especially preferable.

To laminate the polarization film onto the protective film, it is preferable to use an adhesive with optical isotropy, and examples of such an adhesive include a polyvinyl alcohol adhesive, a urethane adhesive, an epoxy adhesive and an acrylic adhesive. When an adherence property between the polarization film and the protective film is poor, the protective film can be appropriately subjected to a surface treatment such as a corona treatment, a primer treatment or a coating treatment prior to laminating the polarization film in order to improve its adherence property.

When the protective film using the molded article for the optical element of the present invention is used in one surface of the polarizer and the protective film consisting of the acrylic resin (d) is used in the other surface, disadvantages such as warpage or curl due to a characteristic difference between the resins and abnormality due to stress caused by a difference in moisture absorption, are reduced.

There is no special limitation on the polarization film for use in such a polarizer. However, for example, a preferred polarization film is a uniaxially drawn resin film which absorbs and orients a dichroic dyestuff.

Such a polarization film can be manufactured using a known method, and manufactured by a method disclosed in, for example, Japanese Patent Application Laid-Open No. 2002-174729. An example of the method is described as follows.

A resin constituting the polarization film is preferably a polyvinyl alcohol resin, and the polyvinyl alcohol resin is preferably obtained by saponifying a polyvinyl acetate resin. Here, in addition to polyvinyl acetate which is a homopolymer of vinyl acetate, examples of the polyvinyl acetate resin include a copolymer of vinyl acetate and another monomer copolymerizable with vinyl acetate. Examples of the other monomer to be copolymerized with vinyl acetate include unsaturated carboxylic acids, olefins, vinyl ethers, and unsaturated sulfonic acids. Moreover, a degree of saponification of the polyvinyl alcohol resin is preferably 85 to 100 mol %, more preferably 98 to 100 mol %. This polyvinyl alcohol resin may further be modified. For example, poly(vinyl formal) or polyvinyl acetal modified with aldehyde or the like may be used. A degree of polymerization of the polyvinyl alcohol resin is preferably 1000 to 10000, more preferably 1500 to 10000.

The polarization film can be manufactured by, for example, preparing a film from a resin, drawing the film uniaxially, dyeing the drawn polyvinyl alcohol resin film with the dichroic dyestuff to adsorb iodine or dichroic dye, treating the polyvinyl alcohol resin film which has adsorbed the dichroic dyestuff with an aqueous boric acid solution, and water-washing the film after the treatment with the aqueous boric acid solution.

The uniaxial drawing may be carried out before the dyeing with the dichroic dyestuff, simultaneously with the dyeing with the dichroic dyestuff, or after the dyeing with the dichroic dyestuff. When the uniaxial drawing is carried out after the dyeing with the dichroic dyestuff, the uniaxial drawing may be carried out before the boric acid treatment or during the boric acid treatment. Moreover, the uniaxial drawing may be carried out in a plurality of stages.

To carry out the uniaxial drawing, the film may uniaxially be drawn between rolls having different peripheral speeds, or may uniaxially be drawn using a heat roll. Dry drawing carried out in the atmosphere can be employed, or wet drawing carried out for the film wetted with a solvent can be employed. The draw ratio is generally about four to eight times.

To dye the resin film with the dichroic dyestuff, for example, the resin film may be immersed into an aqueous solution containing the dichroic dyestuff. Examples of the dichroic dyestuff include iodine and the dichroic dye.

When iodine is used as the dichroic dyestuff, it is possible to employ a method for immersing the resin film into an aqueous solution containing iodine and potassium iodide to dye the film. A content of iodine in this aqueous solution is preferably about 0.01 to 0.5 parts by mass per 100 parts by mass of water, and a content of potassium iodide is preferably about 0.1 to 10 parts by mass per 100 parts by mass of water. A temperature of this aqueous solution is preferably about 20 to 40° C., and an immersion time into this aqueous solution is preferably about 30 to 300 seconds.

When the dichroic dye is used as the dichroic dyestuff, it is possible to employ a method for immersing the polyvinyl alcohol resin film into an aqueous solution containing the dichroic dye to dye the film. A content of the dichroic dye in this aqueous solution is preferably about $1 \times 10^{-3}$ to $1 \times 10^{-2}$ parts by mass per 100 parts by mass of water. This aqueous solution may contain inorganic salt such as sodium sulfate. A temperature of this aqueous solution is preferably about 20 to 80° C., and an immersion time into this aqueous solution is preferably about 30 to 300 seconds.

After dyeing the film with the dichroic dyestuff, the boric acid treatment is carried out by immersing the dyed resin film into an aqueous boric acid solution. A content of boric acid in the aqueous boric acid solution is preferably about 2 to 15 parts by mass, further preferably 5 to 12 parts by mass with respect to 100 parts by mass of water. When iodine is used as the dichroic dyestuff, this aqueous boric acid solution preferably contains potassium iodide. A content of potassium iodide in the aqueous boric acid solution is preferably about 2 to 20 parts by mass, more preferably 5 to 15 parts by mass with respect to 100 parts by mass of water. An immersion time into the aqueous boric acid solution is preferably about 100 to 1200 seconds, more preferably about 150 to 600 seconds, further preferably about 200 to 400 seconds. A temperature of the aqueous boric acid solution is preferably 50° C. or more, more preferably 50 to 85° C.

After boric acid treatment, the resin film is preferably subjected to a water washing treatment. The water washing treatment is carried out by, for example, immersing the boric acid-treated polyvinyl alcohol resin film into water. After water washing treatment, the film is appropriately subjected to a drying treatment to obtain the polarization film. The temperature of the water in the water washing treatment is preferably about 5 to 40° C., and the immersion time is preferably about 2 to 120 seconds. A subsequent drying treatment is preferably carried out using a hot air drier or a far infrared heater. A drying temperature is preferably 40 to 100° C. A treatment time in the drying treatment is preferably about 120 seconds to 600 seconds.

In considering the ease of handling of the film and the demand for a thinner display, the final film thickness is preferably 5 to 200 μm, further preferably 10 to 150 μm, especially preferably 15 to 100 μm.

EXAMPLES

The present invention will specifically be described in the following examples.

An evaluation method used in the present invention and the examples will be described.

(1) Evaluation Method (I) Measurement of Photoelastic Coefficient, Judgment of Positive or Negative Inherent Birefringence (Measurement of Photoelastic Coefficient)

A birefringence measurement device described in detail in Macromolecules 2004, 37, 1062-1066 is used. A tension device for a film is placed in a path of laser light. The birefringence of a test piece of a resin composition with a width of 7 mm is measured at 23° C., while a tensile stress is applied to the piece. A strain rate during stretching is set to 20%/minute (a length between chucks: 30 mm, a chuck movement speed: 6 mm/minute). Values measured in this way are plotted as coordinates with a y-axis indicating a birefringence (Δn) and an x-axis indicating a stretch stress ($\sigma_R$). The gradient of the initial straight portion of the plots, and the photoelastic coefficient ($C_R$), is determined by least square approximation. The smaller the absolute value of the gradient is, the closer to zero the photoelastic coefficient is, and this indicates that a preferable optical characteristic is provided.

(Determination of Positive or Negative of Inherent Birefringence)

npr−nvt of a resin at 23° C. is measured after having drawn the test piece by applying a tensile stress under a temperature of glass transition temperature to glass transition temperature+50° C., and having quenched and hardened the drawn test piece npr−nvt at 23° C. is measured. If npr−nvt is negative, it is determined that the inherent birefringence is negative. If npr−nvt is positive, it is determined that the inherent birefringence is positive.

(II) Measurement of all-Wavelength Light Transmittance

Measurement is Carried Out in Accordance with ASTM D1003.

(III) Measurement of Molecular Weight i) Styrene Resin

A mass-average molecular weight is measured at 40° C. using GPC (Measuring apparatus: GPC-8020 manufactured by Tosoh Co., Ltd., Detector: differential refractive index detector (RI), Column: Shodex K-805 manufactured by SHOWA DENKO K.K., 801 connection), and using chloroform as a solvent based on the standard terms of commercial standard polystyrene.

ii) Acrylic Resin

"TSK Super HH-M" (×2) and "TSK Super H250" (×1), each manufactured by Tosoh Co., Ltd. are arranged in series with gel permeation chromatography (HLC-8120+8020) columns manufactured by Tosoh Co., Ltd. and a differential refractive index detector is used as a detector. An acrylic resin (0.02 g), a sample to be analyzed, is dissolved in 20 cc of a THF solvent and an elution time and intensity are measured while setting an injection amount at 10 ml and a developing flow rate at 0.3 ml/min. Using a calibration curve drawn using, as a standard sample, a mono-disperse methacrylic acid resin of GL Science Co., ltd. whose weight average molecular weight is known, the weight average molecular weight (Mw) and number average molecular weight (Mn) of the acrylic resin are determined and from them, a molecular weight distribution Mw/Mn is calculated.

(IV) Measurement of Copolymerization Ratio i) Measurement of Copolymerization Ratio of acrylonitrile in styrene-acrylonitrile Copolymer A styrene-acrylonitrile copolymer is molded into a film using a thermal pressing machine, and the absorbance derived from acrylonitrile group of the film at 1603 $cm^{-1}$, 2245 $cm^{-1}$ is measured using FT-410 manufactured by JASCO Corporation. The content of acrylonitrile in the styrene-acrylonitrile copolymer is quantified based on the relation between the amount of acrylonitrile in the styrene-acrylonitrile copolymer and the ratio of the absorbance at 1603 $cm^{-1}$, and the absorbance at 2245 $cm^{-1}$ obtained in advance by using a styrene-acrylonitrile copolymer whose copolymerization ratio of acrylonitrile is known, ii) Measurement of Copolymerization Ratio of maleic anhydride in styrene/maleic anhydride Copolymer A styrene/maleic anhydride copolymer is dissolved as a sample in deuterated chloroform and the resulting solution is subjected to NMR measurement using a $^1$H-NMR spectrometer (JNM ECA-500) manufactured by JEOL at a frequency of 500 MHz and room temperature. Based on the measurement results, a molar ratio of the styrene unit to the maleic anhydride unit in the sample is determined from an area ratio of the proton peak (around 7 ppm) of the benzene ring in the styrene unit to the proton peak (around from 1 to 3 ppm) of the alkyl group in the maleic anhydride unit. From the molar ratio thus obtained and a mass ratio (styrene unit:maleic anhydride unit=104:98) of these monomer units, a copolymerization ratio of the maleic anhydride in the styrene/maleic anhydride copolymer is determined.

iii) Measurement of Copolymerization Ratio of methacrylic acid in styrene/methacrylic acid Copolymer A styrene/methacrylic acid copolymer is dissolved as a sample in deuterated chloroform and the resulting solution is subjected to NMR measurement using a $^1$H-NMR spectrometer (JNM ECA-500) manufactured by JEOL at a frequency of 500 MHz and room temperature. Based on the measurement results, a molar ratio of the styrene unit to the methacrylic acid unit in the sample is determined from an area ratio of the proton peak of the benzene ring in the styrene unit (around 7 ppm) to the proton peak of the alkyl group in the methacrylic acid unit (around from 1 to 3 ppm). From the molar ratio thus obtained and a mass ratio (styrene unit:methacrylic acid unit=104:86) of these monomer units, a copolymerization ratio of the methacrylic acid in the styrene/methacrylic acid copolymer is determined.

iv) Measurement of Copolymerization Ratio of Each Unit in methyl methacrylate/maleic anhydride/styrene Copolymer A methyl methacrylate/maleic anhydride/styrene is dissolved as a sample in deuterated chloroform and the resulting solution is subjected to NMR measurement using a $^1$H-NMR spectrometer (JNM ECA-500) manufactured by JEOL at a frequency of 500 MHz and room temperature. Based on the measurement results, a molar ratio of the styrene unit, maleic anhydride unit and methyl methacrylate unit in the sample is determined from an area ratio of the proton peak of the benzene ring in the styrene unit (around 7 ppm), the proton peak of the alkyl group in the maleic anhydride unit (around from 1 to 3 ppm), and the proton peak of the methyl group in the methyl methacrylate unit (around from 0.5 to 1 ppm). From the molar ratio thus obtained and a mass ratio (styrene unit:maleic anhydride unit:methyl methacrylate unit=104:86:100) of these monomer units, a copolymerization ratio of each unit of the methyl methacrylate/maleic anhydride/styrene copolymer is determined.

v) Measurement of Copolymerization Ratio of Each Unit in methyl methacrylate/6-Membered-Ring-Containing Unit/ Styrene Copolymer A methyl methacrylate/6-membered-ring-containing unit/ styrene copolymer (50 mg) is dissolved as a sample in 0.75 mL of deuterated dimethylsulfoxide (d-DMSO) and the resulting solution is subjected to NMR measurement using a $^1$H-NMR spectrometer (JNM ECA-500) manufactured by JEOL at a frequency of 500 MHz and 40° C.

From the measurement results, an integral value of a proton peak of the benzene ring in the styrene unit (around 7 ppm) and an integral value of a proton peak of a carboxylic acid in the methacrylic acid unit (around from 12 to 13 ppm) are obtained and from these integral values, a molar ratio of the methacrylic acid unit to the styrene unit is determined.

An integral value of a proton peak of a methyl group at a COOMe site of the methyl methacrylate unit is determined by subtracting an integral value of a peak observed around 3.3 ppm due to water in DMSO from a total of integral values of a plurality of peaks around from 2.7 to 4 ppm. From the value thus obtained and an integral value of a proton peak of the benzene ring in the styrene unit (around 7 ppm), a molar ratio of the methyl methacrylate unit to the styrene unit is determined.

A molar ratio of the 6-membered-ring-containing unit to the styrene unit is determined in the following manner. Described specifically, a plurality of peaks around from 0 to 2.2 ppm are recognized to be derived from a methylene group contained in the main chain in the styrene unit, a methylene group contained in the main chain in the methacrylic acid unit, a methyl group directly bonded to the main chain in the methacrylic acid unit, a methylene group contained in the main chain in the methyl methacrylate unit, a methyl group directly bonded to the main chain in the methyl methacrylate unit, a methylene group contained in the main chain in the 6-membered-ring-containing unit, a methylene group contained in the 6-membered ring in the 6-membered-ring-containing unit, and a methyl group directly bonded to the 6-membered ring in the 6-membered-ring-containing unit. A molar ratio of the 6-membered-ring-containing unit to the styrene unit is calculated while making use of a ratio of a total of the integral values of the plurality of peaks around from 0 to 2.2 ppm and an integral value of the proton peak of the benzene ring in the styrene unit (around 7 ppm), the molar ratio of the methacrylic acid unit to the styrene unit determined previously, and the molar ratio of the methyl methacrylate unit to the styrene unit determined previously.

From the molar ratios of the respective units to the styrene unit thus determined, a molar ratio of the methyl methacrylate unit, 6-membered-unit-containing unit represented by the chemical formula [9], styrene unit and methacrylic acid unit in the sample is determined and from the molar ratio thus determined and a mass ratio (methyl methacrylate unit:6-membered-ring-containing unit:styrene unit:methacrylic acid unit=100:154 (for example, in the case of the methyl methacrylate/6-membered-ring-containing unit/styrene copolymer (d-3)):104:86), a copolymerization ratio of each unit in the methyl methacrylate/6-membered-ring-containing unit/styrene copolymer is determined.

(V) In-Plane Retardation (Re), Retardation in the Thickness Direction (Rth) and Nz Coefficient (Measurement of In-Plane Retardation (Re))

A thickness d (nm) of a film is measured using a thickness gauge. This value is input into a birefringence measurement device RETS-100 manufactured by Otsuka Electronics Co., Ltd., a sample is arranged so that a measurement surface is perpendicular to measurement light, and the in-plane retardation (Re) at 23° C. is measured and calculated by a rotating analyzer process.

(Measurement of Thickness-Direction Retardation (Rth), Nz)

The average index of refraction n of an optical film is measured at 23° C. by use of a laser refractometer Model 2010 manufactured by Metricon Co. Then, the average index of refraction n and the film thickness d (nm) are input into the birefringence measurement device RETS-100 manufactured by Otsuka Electronics Co., Ltd., and the thickness-direction retardation (Rth) and the Nz coefficient at 23° C. are measured and calculated.

(VI) Measurement of Spectral Transmittance

A spectrum is measured using U-3310 manufactured by Hitachi Co. Ltd. to obtain a transmittance in 380 nm.

(VII) Measurement of Warpage of Polarizer

A film with a size of 200 mm×200 mm squares cut out from a polarizer is arranged on a horizontal flat base so that the center of the film comes in contact with the base, and is left to stand at 23° C. under an atmosphere of 50% RH for 72 hours, and the average height of the warpage of the four corners of the cut film from the base is calculated.

(VIII) Measurement of Durability of Polarizer at High Temperature and High Humidity Degrees of polarization before and after the polarizer is held under conditions of 60° C. and 90% RH for 1000 hours are determined from the following formula, and the retention ratio of the polarization degree is calculated using this value to evaluate durability.

$$\text{Polarization degree}(\%) = \{[(H_2 - H_1)/(H_2 + H_1)] \times \frac{1}{2}\} \times 100,$$

wherein $H_2$ is a value (parallel transmittance) measured using a spectrophotometer in a state where two polarizers are superimposed on each other so that orientation directions of the plates are the same, and $H_1$ is a value (orthogonal transmittance) measured in a state where two polarizers are superimposed on each other so that the orientation directions are perpendicular to each other. The polarization degree is measured using a spectrophotometer UV-3150 manufactured by Shimadzu Seisakusho Co. Ltd.

The polarization degree retention ratio is a numeric value obtained by dividing the polarization degree after a retention test under conditions of 60° C. and 90% RH for 1000 hours by the polarization degree before the test, and multiplying the resultant value by 100. The larger the numeric value is, the higher the durability is.

(2) Preparation of Raw Materials (I) Resin (a) Having a Positive Photoelastic Coefficient and Negative Inherent Birefringence 1) Styrene-acrylonitrile Copolymer (a-1)

A monomer mixture including 72% by mass of styrene, 13% by mass of acrylonitrile and 15% by mass of ethyl benzene was continuously supplied into a complete mixture type reactor with a stirrer, and a polymerization reaction was carried out at 150° C. for a retention time of two hours.

The resultant polymerization solution was continuously supplied to an extruder. An unreacted monomer and solvent were separated and collected in the extruder, and pellets of the styrene-acrylonitrile copolymer (a-1) were obtained.

The resultant styrene-acrylonitrile copolymer (a-1) was clear and colorless. As a result of composition analysis, a content of styrene was determined to be 80% by mass, and a content of acrylonitrile was determined to be 20% by mass. A melt flow rate value measured at 220° C. with a load of 10 kg in accordance with ASTM-D1238 was 13 g/10 minutes. A photoelastic coefficient at 23° C. of the copolymer (undrawn state) was $5.0 \times 10^{-12}$ $Pa^{-1}$, and an inherent birefringence thereof was negative.

2) Styrene-methacrylic acid Copolymer (a-2-1)

Continuous solution polymerization was carried out using a device entirely made of stainless steel. A solution including 75.2% by mass of styrene, 4.8% by mass of methacrylic acid and 20% by mass of ethyl benzene was prepared, and 1,1-tert-butylperoxy-3,3,5-trimethyl cyclohexane was used as a polymerization initiator. This prepared solution was continuously supplied at a speed of 1 L/hr. to a complete mixture type polymerization reactor with a stirrer having an inner volume of 2 L, and polymerization reaction was carried out at 136° C.

The polymerized solution containing 49% of solid content was continuously taken out, first preheated to 230° C., kept at 230° C., supplied to a devolatilizer having an internal pressure reduced to 20 torr, and continuously discharged with a gear pump of a lower part of the devolatilizer after elapse of an average retention time of 0.3 hour.

The resultant styrene-methacrylic acid copolymer (a-2-1) was colorless and clear, and as a result of composition analysis, a styrene content was determined to be 92% by mass, and a methacrylic acid content was determined to be 8% by mass. A melt flow rate value measured at 230° C. with a load of 3.8 kg in accordance with ASTM-D1238 was 5.2 g/10 minutes. A photoelastic coefficient at 23° C. of the copolymer (undrawn) was $4.8 \times 10^{-12}$ $Pa^{-1}$, and an inherent birefringence thereof was negative.

3) Styrene-methacrylic acid Copolymer (a-2-2)

In a similar manner to that employed for the copolymer (a-2-1), except that the charged amounts of styrene and methacrylic acid were changed to 74.4% by mass and 5.6% by mass, respectively, a styrene-methacrylic acid copolymer (a-2-2) was obtained.

The resulting copolymer was colorless and clear. An analysis of its composition showed the resulting copolymer had a styrene content of 90.5% by mass and a methacrylic acid content of 9.5% by mass. In addition, the resulting copolymer had a photoelastic coefficient (undrawn) at 23° C. of 4.5×$10^{-12}$ Pa$^{-1}$ and a negative inherent birefringence.

4) Styrene-methacrylic acid Copolymer (a-2-3)

In a similar manner to that employed for the copolymer (a-2-1), except that the charged amounts of styrene and methacrylic acid were changed to 70.4% by mass and 9.6% by mass, respectively, a styrene-methacrylic acid copolymer (a-2-3) was obtained.

The resulting copolymer was colorless and clear. An analysis of its composition showed the resulting copolymer had a styrene content of 85% by mass and a methacrylic acid content of 15% by mass. In addition, the resulting copolymer had a photoelastic coefficient (undrawn) at 23° C. of 4.0×$10^{-12}$ Pa$^{-1}$ and a negative inherent birefringence.

3) Styrene-maleic anhydride Copolymer (a-3-1)

Continuous solution polymerization was carried out using a device entirely made of stainless steel. 91.7 parts by mass of styrene and 8.3 parts by mass of maleic anhydride, having a total of 100 parts, were prepared (both of them were not mixed at this time), and 5 parts by mass of methyl alcohol and 0.03 part by mass of 1,1-tert-butylperoxy-3,3,5-trimethyl cyclohexane as a polymerization initiator were mixed with styrene to prepare a first prepared solution. The solution was continuously supplied at a speed of 0.95 kg/hr. to a complete mixture polymerization reactor with a jacket having an inner volume of 4 L.

Maleic anhydride heated to 70° C. was supplied as a second prepared solution to the same polymerization reactor at a speed of 0.10 kg/hr, and polymerization was carried out at 111° C. When a polymerization conversion ratio reached to 54%, the polymerized solution was continuously taken out from the polymerization reactor, first preheated to 230° C., kept at 230° C., supplied to a devolatilizer having an internal pressure reduced to 20 torr, and continuously discharged with a gear pump of a lower part of the devolatilizer after an elapse of an average retention time of 0.3 hour to obtain a styrene-maleic anhydride copolymer (a-3-1).

The resultant styrene-maleic anhydride copolymer (a-3) was colorless and clear. As a result of composition analysis, a content of styrene was determined to be 85% by mass, and a content of maleic anhydride unit was determined to be 15% by mass, and a melt flow rate value measured at 230° C. with a load of 2.16 kg in accordance with ASTM-D1238 was 2.0 g/10 minutes. A photoelastic coefficient at 23° C. of the copolymer (undrawn state) was 4.1×$10^{-12}$ Pa$^{-1}$, and an inherent birefringence thereof was negative.

6) Styrene-maleic anhydride Copolymer (a-3-2)

In a similar manner to that employed for the copolymer (a-3-1) except that the charged amounts of styrene and maleic anhydride were changed to 85.1% by mass and 14.9% by mass, respectively, a styrene-methacrylic acid copolymer (a-3-2) was obtained.

The resulting copolymer was colorless and clear. An analysis of its composition showed the resulting copolymer had a styrene content of 73% by mass and a methacrylic acid content of 27% by mass. In addition, it had a photoelastic coefficient (undrawn) at 23° C. of 2.7×$10^{-12}$ Pa$^{-1}$ and a negative inherent birefringence.

(II) Resin (b) Having a Negative Photoelastic Coefficient and Negative Inherent Birefringence 1) Methyl methacrylate-methyl acrylate copolymer (b-1)

To a monomer mixture including 89.2 parts by mass of methyl methacrylate, 5.8 parts by mass of methyl acrylate and 5 parts by mass of xylene, 0.0294 part by mass of 1,1-di-t-butylperoxy-3,3,5-trimethyl cyclohexane and 0.115 part by mass of n-octylmercaptan were added and uniformly mixed therein. The solution was continuously supplied to a sealed type pressure resistant reactor having an inner volume of 10 L. Polymerization reaction is carried out at an average temperature of 130° C. for an average retention time of two hours while stirring, and then the reaction solution was continuously transferred to a storage tank with deaeration equipment connected to the reactor to remove volatile portions therefrom. The melted solution was further continuously transferred to an extruder to obtain pellets of a (methyl methacrylate-methyl acrylate) (b-1) copolymer.

The resultant methyl methacrylate-methyl acrylate copolymer (b-1) had a methyl acrylate content of 6.0% by mass and a mass-average molecular weight of 145,000, and a melt flow rate value measured at 230° C. with a load of 3.8 kg in accordance with ASTM-D1238 was 1.0 g/10 minutes. A photoelastic coefficient at 23° C. of the copolymer (undrawn state) was −4.2×$10^{-12}$ Pa$^{-1}$, and an inherent birefringence was negative.

2) Methyl methacrylate-methyl acrylate Copolymer (b-2)

To a monomer mixture including 93.2 parts by mass of methyl methacrylate, 2.3 parts by mass of methyl acrylate and 3.3 parts by mass of xylene, 0.03 part by mass of 1,1-di-t-butylperoxy-3,3,5-trimethyl cyclohexane and 0.12 part by mass of n-octylmercaptan were added and uniformly mixed therein. The solution was continuously supplied to a sealed type pressure resistant reactor having an inner volume of 10 L. Polymerization reaction was carried out at an average temperature of 130° C. for an average retention time of two hours while stirring, and then the reaction solution was continuously sent to a storage tank connected to the reactor to remove volatile portions therefrom under constant conditions. The melted solution was further continuously transferred to an extruder to obtain pellets of a methyl methacrylate-methyl acrylate copolymer (b-2).

The resultant methyl methacrylate-methyl acrylate copolymer (b-2) had a methyl acrylate content of 2.0% and a mass-average molecular weight of 102,000, and a melt flow rate value measured at 230° C. with a load of 3.8 kg in accordance with ASTM-D1238 was 2.0 g/10 minutes. A photoelastic coefficient at 23° C. of the copolymer (undrawn state) was −4.4×$10^{-12}$ Pa$^{-1}$, and an inherent birefringence was negative.

3) Methyl methacrylate/maleic acid/styrene Copolymer (Copolymer B) (b-3)

A methyl metharylate/maleic anhydride/styrene copolymer was obtained by the method described in Japanese Patent Publication No. 63-1964.

The resulting methyl methacrylate/maleic anhydride/styrene copolymer (b-3) had a methyl methacrylate content of 74% by mass, a maleic anhydride content of 10% by mass and a styrene content of 16% by mass, a weight average molecular weight of 121000, and a melt flow rate (ASTM-D1238; 230° C., 3.8 kg load) of 1.6 g/10 minutes. In addition, it had a photoelastic coefficient (undrawn) at 23° C. of $-2.9 \times 10^{-12}$ $Pa^{-1}$ and a negative inherent birefringence.

(III) Ultraviolet Absorbent (c)

A benzotriazole compound (c-1) (ADEKASTAB LA-31 (melting point (Tm): 195° C.) manufactured by ADEKA Corporation) was used. A mass decrease ratio in heating from 23° C. to 260° C. at a rate of 20° C./min. was measured using ThermoPlus TG8120 manufactured by Rigaku Denki K.K., and determined to be 0.03%.

(IV) Polycarbonate

As a comparative example, polycarbonate (WONDERLITE PC-110 manufactured by Asahi Kasei Corporation) was used. A photoelastic coefficient of polycarbonate (undrawn state) was $70 \times 10^{-12}$ $Pa^{-1}$, and an inherent birefringence thereof was positive.

(V) Acryl Resin (d)

1) Methyl methacrylate/methyl acrylate Copolymer (d-1)

The above-mentioned methyl methacrylate-methyl acrylate copolymer (b-1) was used as a methyl methacrylate/methyl acrylate copolymer (d-1).

2) A methyl methacrylate-maleic anhydride-styrene copolymer (copolymer D1) (d-2)

A methyl methacrylate-maleic anhydride-styrene copolymer was obtained by a method disclosed in Japanese Patent Publication No. 63-1964.

The resultant methyl methacrylate-maleic anhydride-styrene copolymer (d-2) had a composition of 74% by mass of methyl methacrylate, 10% by mass of maleic anhydride and 16% by mass of styrene, and the copolymer melt flow rate value (ASTM-D1238; 230° C., a load of 3.8 kg) was 1.6 g/10 minutes.

3) Preparation of a Film of methyl methacrylate/6-Membered-Ring-Containing Unit/Styrene Copolymer (Copolymer D2) (d-3)

Trial Example 4

A mixed solution composed of 48 parts by mass of methyl methacrylate, 5 parts by mass of styrene, 17 parts by mass of methacrylic acid, 30 parts by mass of cyclohexanol (water content: 2%, solubility parameter δ=11.4), 50 ppm of 1,1-di(tert-butylperoxy)cyclohexane and 1400 ppm of n-octylmercaptan was prepared, followed by bubbling with a nitrogen gas for 10 minutes. The resulting mixed solution was continuously fed to a jacketed mixing reactor having an internal volume of 3 L at a rate of 1.5 L/hr for polymerization. After reaction at a polymerization temperature of 135° C. for 2 hours, the polymer was dissolved completely and a solid content of the polymer contained in the polymerization solution was 40% by mass. Immediately after that, the polymerization solution was continuously fed through a heater to a devolatilizing tank. Unreacted monomers and solvent were removed and the 6-membered-ring-containing unit was formed in the devolatilizing tank by holding the polymerization solution at 25° C. and 25 Torr for 40 minutes. The unreacted monomers and solvent were collected via a collation line.

The polymer thus obtained was composed of 64% by mass of a methyl methacrylate unit, 9% by mass of a styrene unit, 3% by mass of a methacrylic acid unit and 24% by mass of a 6-membered-ring-containing unit, had a melt flow rate (ASTM-D1238; 230° C.; 3.8 kg load) of 1.0 g/10 minutes, Mw/Mn of 1.9, and Tg of 130° C. In addition, it had a photoelastic coefficient at 23° C. of $-2.3 \times 10^{-12}$ $Pa^{-1}$ and a negative inherent birefringence.

(VI) Fatty Polyester Resin (e)

Polylactic acid (e-1) (4032D manufactured by Cargilldow Co.) was used.

Examples 1, 3 to 5, 41 to 45 and Comparative Examples 1 to 4, 9, 12

Resin compositions with blend ratios described in Table 1 were extruded to obtain undrawn films by using an extruder (KZW15TW-25MG-NH type/provided with a T-die having a width of 150 mm/a lip with a thickness of 0.5 mm) provided with the T-die and manufactured by Techno Bell Co., while adjusting a screw rotation number, a temperature of the resin in a cylinder of the extruder, and a temperature of the T-die.

The composition, extrusion molding conditions, a film thickness and a photoelastic coefficient of each undrawn film are shown in Table 1. For comparison, the photoelastic coefficient of a commercial triacetyl cellulose (TAC) film (LOFO manufactured by High Tech Film Co., trade name TACPHAN, having a positive photoelastic coefficient and a positive inherent birefringence) is shown as Comparative Example 4.

Any of undrawn films (Examples 1, 3 to 5, 41 to 45) of the present invention had a small absolute value of the photoelastic coefficient and high transparency. In contrast, an undrawn film (Comparative Example 3) obtained from polycarbonate conventionally used as a retarder film and a TAC film conventionally used as a protective film of a polarizer had a very large absolute value of the photoelastic coefficient. Moreover, films (Comparative Examples 1, 2, 9, 12) in which resins (a) and (b) were used singly had a large absolute value of the photoelastic coefficient as compared with Examples 1, 3 to 5, 41 to 45.

TABLE 1

|  |  |  | Example 1 | Example 3 | Example 4 | Example 5 | Example 41 |
|---|---|---|---|---|---|---|---|
| Composition (parts by mass) | Resin(a) | Styrene-acrylonitrile copolymer (a-1) | 50 | — | — | — | 50 |
|  |  | Styrene-methacrylic copolymer (a-2-1) | — | 25 | 50 | 75 | — |
|  |  | Styrene-methacrylic copolymer (a-2-2) | — | — | — | — | — |
|  |  | Styrene-methacrylic copolymer (a-2-3) | — | — | — | — | — |

TABLE 1-continued

|  |  |  |  |  |  |  |
|---|---|---|---|---|---|---|
|  |  | Styrene-maleic anhydride copolymer (a-3-1) | — | — | — | — | — |
|  |  | Styrene-maleic anhydride copolymer (a-3-2) | — | — | — | — | — |
|  | Resin(b) | Methyl methacrylate-methyl acrylate copolymer (b-1) | 50 | 75 | 50 | 25 | — |
|  |  | Methyl methacrylate-maleic anhydride-styrene copolymer (b-3) | — | — | — | — | 50 |
|  |  | Polycarbonate | — | — | — | — | — |
| Molding conditions | Resin temperature in cylinder of extruder(° C.) |  | 235 | 239 | 237 | 231 | 240 |
|  | Extruder T-die temperature(° C.) |  | 240 | 240 | 240 | 235 | 250 |
| Film characteristics | Thickness(μm) |  | 94 | 100 | 95 | 90 | 100 |
|  | All-wavelength light transmittance(%) |  | 92% or more | 92% or more | 92% or more | 92% or more | 92% or more |
|  | Photoelastic coefficient($\times 10^{-12}$ Pa$^{-1}$) |  | 0.4 | −2.5 | 0.5 | 3 | 1.4 |

|  |  |  | Example 42 | Example 43 | Example 44 | Example 45 | Comparative Example 1 |
|---|---|---|---|---|---|---|---|
| Composition (parts by mass) | Resin(a) | Styrene-acrylonitrile copolymer (a-1) | 30 | — | — | — | 100 |
|  |  | Styrene-methacrylic copolymer (a-2-1) | — | — | — | — | — |
|  |  | Styrene-methacrylic copolymer (a-2-2) | — | 75 | — | — | — |
|  |  | Styrene-methacrylic copolymer (a-2-3) | — | — | 75 | — | — |
|  |  | Styrene-maleic anhydride copolymer (a-3-1) | — | — | — | — | — |
|  |  | Styrene-maleic anhydride copolymer (a-3-2) | — | — | — | 60 | — |
|  | Resin(b) | Methyl methacrylate-methyl acrylate copolymer (b-1) | — | 25 | 25 | 40 | — |
|  |  | Methyl methacrylate-maleic anhydride-styrene copolymer (b-3) | 70 | — | — | — | — |
|  |  | Polycarbonate | — | — | — | — | — |
| Molding conditions | Resin temperature in cylinder of extruder(° C.) |  | 240 | 230 | 245 | 230 | 227 |
|  | Extruder T-die temperature(° C.) |  | 250 | 250 | 260 | 250 | 230 |
| Film characteristics | Thickness(μm) |  | 100 | 91 | 90 | 96 | 108 |
|  | All-wavelength light transmittance(%) |  | 92% or more | 92% or more | 92% or more | 92% or more | 92% or more |
|  | Photoelastic coefficient($\times 10^{-12}$ Pa$^{-1}$) |  | −1.4 | 2.4 | 2.2 | −0.5 | 5 |

|  |  |  | Comparative Example 2 | Comparative Example 3 | Comparative Example 4 | Comparative Example 9 | Comparative Example 12 |
|---|---|---|---|---|---|---|---|
| Composition (parts by mass) | Resin(a) | Styrene-acrylonitrile copolymer (a-1) | — | — | Commercial triacetyl cellulose (TAC) film | — | — |
|  |  | Styrene-methacrylic copolymer (a-2-1) | — | — |  | 100 | — |
|  |  | Styrene-methacrylic copolymer (a-2-2) | — | — |  | — | — |
|  |  | Styrene-methacrylic copolymer (a-2-3) | — | — |  | — | — |
|  |  | Styrene-maleic anhydride copolymer (a-3-1) | — | — |  | — | 100 |
|  |  | Styrene-maleic anhydride copolymer (a-3-2) | — | — |  | — | — |
|  | Resin(b) | Methyl methacrylate-methyl acrylate copolymer (b-1) | 100 | — |  | — | — |
|  |  | Methyl methacrylate-maleic anhydride-styrene copolymer (b-3) | — | — |  | — | — |
|  |  | Polycarbonate | — | 100 |  | — | — |
| Molding conditions | Resin temperature in cylinder of extruder(° C.) |  | 240 | 282 |  | 216 | 250 |
|  | Extruder T-die temperature(° C.) |  | 245 | 280 |  | 230 | 250 |
| Film characteristics | Thickness(μm) |  | 88 | 81 | 99 | 100 | 107 |
|  | All-wavelength light transmittance(%) |  | 92% or more | 92% or more | 92% or more | 92% or more | 92% or more |
|  | Photoelastic coefficient($\times 10^{-12}$ Pa$^{-1}$) |  | −4.2 | 70 | 10 | 4.8 | 4.1 |

Example 2, 46 and Comparative Examples 5, 6 and 7

Resin compositions were extruded to obtain undrawn films by using an extruder (KZW15TW-25MG-NH type/provided with a T-die having a width of 150 mm/a lip with a thickness of 0.5 mm) provided with a T-die and manufactured by Techno Bell Co., while adjusting a screw rotation number, a temperature of the resin in a cylinder of the extruder, and a temperature of the T-die. A direction of flow of the film (an extruding direction) was defined as MD direction, and a direction perpendicular to the MD direction was defined as TD direction.

Subsequently, films with a width of 50 mm cut out from the resin undrawn films were uniaxially drawn (a length between chucks: 50 mm, a chuck movement speed: 500 mm/minute) using a tension tester to obtain the uniaxially drawn films of Examples 2 and 46, and Comparative Examples 5 to 7.

The composition, extrusion molding conditions, drawing conditions and film characteristics of each uniaxially drawn film are shown in Table 2. For comparison, a photoelastic coefficient of a commercial triacetyl cellulose (TAC) film (LOFO manufactured by High Tech Film Co., trade name TACPHAN, having a photoelastic coefficient of $10 \times 10^{-12}$ $Pa^{-1}$ and a positive inherent birefringence) is shown as Comparative Example 4.

The uniaxially drawn film (Examples 2 and 46) of the present invention had a small absolute value of the photoelastic coefficient, while uniaxially drawn films of comparative examples (Comparative Examples 5 and 6) had large absolute values of the photoelastic coefficient.

Additionally, the uniaxially drawn film (Examples 2 and 46) had a large birefringence sufficient for use as a retarder film, and had a negative value of Rth.

Ltd., while adjusting a screw rotation number, a resin temperature in cylinder of the extruder, and a temperature of the T-die.

The undrawn films were uniaxially drawn in a film flow direction (an extruding direction) (an MD direction) by use of a roll-type vertical drawing machine manufactured by Ichikin Kogyo K.K. Rotation speeds of two rolls (a low speed side roll/a high speed side roll) were adjusted so as to obtain a targeted set draw ratio, and the films were continuously drawn between the rolls.

Subsequently, the resultant vertically uniaxially drawn films were continuously drawn in a direction (a TD direction) perpendicular to the MD direction by use of a tenter drawing machine manufactured by Ichikin Kogyo K.K. Drawings were carried out at a flow speed of 2 m/minute while adjusting a distance between tenter chucks in order to obtain a targeted draw ratio.

The composition, extrusion molding conditions, drawing conditions and film characteristics of each film are shown in Tables 3-1 and 3-2.

Each of the films in Examples 6 to 25 and 47 to 56 had a small absolute value of a photoelastic coefficient and high all-wavelength light transmittance, and many exhibited a high birefringence after having been drawn (Examples 7 to 17, 19 to 25, 41 to 56). In contrast, the films of Comparative Examples 13 to 15 in which resins (a) or (b) were used singly, had a large absolute value of the photoelastic coefficient as compared with the films of Examples 6 to 25 in which both of the resins were blended.

Consequently, it could be confirmed from results of Examples 6 to 9, 12 to 14, 15 to 17, 18 and 19, 48, 49, 50, 51, 55, 56 that values of a film birefringence (nx−ny), Re, and Rth can also be changed largely with drawing conditions. Therefore, it could be confirmed that in the present invention, Re and Rth could be controlled by adjusting the drawing conditions.

Furthermore, it could be confirmed from comparison between Examples 20 to 22 and Examples 23 to 25 that ultraviolet rays could be blocked without largely influencing the photoelastic coefficient by adding an ultraviolet absorbent in an amount of as little as 1 part by mass with respect to a total of 100 parts by mass of the resins (a) and (b).

TABLE 2

| | | | Example 2 | Example 46 | Comparative Example 4 | Comparative Example 5 | Comparative Example 6 | Comparative Example 7 |
|---|---|---|---|---|---|---|---|---|
| Composition (parts by mass) | Resin(a) | Styrene-acrylonitrile copolymer (a-1) | 50 | 50 | Commercial triacetyl cellulose (TAC) film | 100 | — | — |
| | Resin(b) | Methyl methacrylate-methyl acrylate copolymer (b-1) | 50 | — | | — | 100 | — |
| | | Methyl methacrylate-maleic anhydride-styrene copolymer (b-3) | — | 50 | | | | |
| | Polycarbonate | | — | — | | — | — | 100 |
| Molding conditions | Resin temperature in cylinder of extruder(° C.) | | 260 | 240 | | 240 | 270 | 280 |
| | Extruder T-die temperature(° C.) | | 260 | 250 | | 240 | 270 | 280 |
| Drawing conditions | Thickness of undrawn film(μm) | | 101 | 116 | | 102 | 101 | 99 |
| | Draw ratio(%) | | 100 | 100 | | 100 | 100 | 100 |
| | Drawing temperature(° C.) | | 128 | 135 | | 128 | 128 | 165 |
| Film characteristics | Thickness(μm) | | 70 | 82 | 99 | 79 | 70 | 54 |
| | Birefringence(nx − ny)(×10$^{-3}$) | | 3.5 | 1.4 | 0.0 | 3.9 | 0.4 | 20.4 |
| | Re(nm) | | 243 | 112 | 1.4 | 312 | 27.2 | 1099 |
| | Rth(nm) | | −139 | −59.6 | 45.9 | −168 | −16.8 | 552.4 |
| | Nz | | −0.07 | −0.03 | 33.2 | −0.04 | −0.11 | 1.01 |
| | Photoelastic coefficient(×10$^{-12}$ Pa$^{-1}$) | | 0.4 | 1.4 | 10 | 5 | −4.2 | 70 |

Examples 6 to 25, 47 to 56, Comparative Examples 13 to 15

Resin compositions having compositions described in Tables 3-1 and 3-2 were extruded to obtain undrawn films by using an extruder (BT-30-C-36-L type/provided with a T-die having a width of 400 mm/a lip with a thickness of 0.8 mm) provided with a T-die and manufactured by PLABOR Co.

TABLE 3-1

| | | | Example | | | | | | | |
|---|---|---|---|---|---|---|---|---|---|---|
| | | | 6 | 7 | 8 | 9 | 10 | 11 | 12 | 13 |
| Composition (parts by mass) | Resin(a) | (a-1) | — | — | — | — | — | — | — | — |
| | | (a-2-1) | 60 | 60 | 60 | 60 | 40 | 60 | 65 | 65 |
| | | (a-3-1) | — | — | — | — | — | — | — | — |
| | Resin(b) | (b-1) | — | — | — | — | — | — | — | — |
| | | (b-2) | 40 | 40 | 40 | 40 | 60 | 40 | 35 | 35 |
| | Ultraviolet absorbent | (c-1) | 1 | 1 | 1 | 1 | 1 | 2 | — | — |
| Molding conditions | Resin temperature in cylinder of extruder(° C.) | | 253 | 253 | 253 | 253 | 254 | 253 | 253 | 253 |
| | Extruder T-die temperature(° C.) | | 257 | 257 | 257 | 257 | 257 | 257 | 257 | 257 |
| Drawing conditions | Draw ratio(%) (MD direction/TD direction) | | undrawn | 50/0 | 50/170 | 200/70 | 200/80 | 250/250 | 100/0 | 0/60 |
| | Drawing temperature(° C.) | | — | 122/— | 129/120 | 129/130 | 128/125 | 122/125 | 131/— | —/125 |
| Film characteristics | Thickness(μm) | | 100 | 95 | 73 | 92 | 95 | 98 | 60 | 81 |
| | Birefringence(nx − ny)(×10⁻³) | | 0.0 | 1.5 | 3.4 | 1.6 | 1.5 | 0.6 | 4.6 | 1.8 |
| | Re(nm) | | 1.2 | 146 | 251 | 147 | 142 | 56 | 275 | 144 |
| | Rth(nm) | | −20 | −168 | −254 | −320 | −296 | −133 | −229 | −160 |
| | \|Re/Rth\| | | 0.06 | 0.87 | 0.99 | 0.46 | 0.48 | 0.42 | 1.2 | 0.9 |
| | Nz | | — | — | — | — | — | — | — | — |
| | Spectral transmittance 380 nm(% T) | | 1.7 | 1.6 | 2.1 | 1.6 | 1.6 | <0.1 | 88 | 88 |
| | Photoelastic coefficient (×10⁻¹² Pa⁻¹) | | 1.6 | 1.3 | 1.3 | 1.2 | <0.1 | 2.6 | 1 | 1 |
| | All-wavelength light transmittance(%) | | 90 or more | 90 or more | 90 or more | 90 or more | 90 or more | 90 or more | 90 or more | 90 or more |

| | | | Example | | | | | | | |
|---|---|---|---|---|---|---|---|---|---|---|
| | | | 14 | 15 | 16 | 17 | 18 | 19 | 20 | 21 |
| Composition (parts by mass) | Resin(a) | (a-1) | — | — | — | — | — | — | — | — |
| | | (a-2-1) | 65 | 75 | 75 | 75 | — | — | — | — |
| | | (a-3-1) | — | — | — | — | 40 | 40 | 30 | 50 |
| | Resin(b) | (b-1) | — | — | — | — | — | — | — | — |
| | | (b-2) | 35 | 25 | 25 | 25 | 60 | 60 | 70 | 50 |
| | Ultraviolet absorbent | (c-1) | — | — | — | — | — | — | — | — |
| Molding conditions | Resin temperature in cylinder of extruder(° C.) | | 253 | 253 | 253 | 253 | 255 | 255 | 255 | 255 |
| | Extruder T-die temperature(° C.) | | 257 | 255 | 255 | 255 | 255 | 255 | 255 | 255 |
| Drawing conditions | Draw ratio(%) (MD direction/TD direction) | | 170/100 | 70/120 | 70/160 | 65/150 | undrawn | 60/200 | 40/160 | 51/190 |
| | Drawing temperature(° C.) | | 132/130 | 128/128 | 128/128 | 128/128 | — | 131/131 | 130/128 | 133/132 |
| Film characteristics | Thickness(μm) | | 91 | 64 | 55 | 65 | 80 | 66 | 87 | 72 |
| | Birefringence(nx − ny)(×10⁻³) | | 1.6 | 0.9 | 2.1 | 2.3 | 0.0 | 2.0 | 1.8 | 3.5 |
| | Re(nm) | | 150 | 60 | 115.5 | 150.7 | 2.9 | 132 | 160 | 253 |
| | Rth(nm) | | −250 | −187.0 | −195.5 | −213.5 | −5.8 | −153 | −173 | −260 |
| | \|Re/Rth\| | | 0.6 | 0.32 | 0.59 | 0.71 | 0.5 | 0.88 | 0.92 | 0.97 |
| | Nz | | — | −2.6 | −1.2 | −0.92 | — | — | −0.58 | −0.53 |
| | Spectral transmittance 380 nm(% T) | | 88 | 88 | 88 | 88 | 88 | 88 | 88 | 88 |
| | Photoelastic coefficient (×10⁻¹² Pa⁻¹) | | 0.9 | 2.9 | 2.9 | 2.9 | −1 | −1 | −1.9 | −0.1 |
| | All-wavelength light transmittance(%) | | 90 or more | 90 or more | 90 or more | 90 or more | 90 or more | 90 or more | 90 or more | 90 or more |

| | | | Example | | | | Comparative Example | | |
|---|---|---|---|---|---|---|---|---|---|
| | | | 22 | 23 | 24 | 25 | 13 | 14 | 15 |
| Composition (parts by mass) | Resin(a) | (a-1) | — | — | — | — | — | — | — |
| | | (a-2-1) | — | — | — | — | 100 | — | — |
| | | (a-3-1) | 70 | 30 | 50 | 70 | — | — | 100 |
| | Resin(b) | (b-1) | — | — | — | — | — | — | — |
| | | (b-2) | 30 | 70 | 50 | 30 | — | 100 | — |
| | Ultraviolet absorbent | (c-1) | — | 1 | 1 | 1 | — | — | — |
| Molding conditions | Resin temperature in cylinder of extruder(° C.) | | 255 | 255 | 255 | 255 | 216 | 246 | 250 |
| | Extruder T-die temperature(° C.) | | 255 | 255 | 255 | 255 | 230 | 245 | 250 |

TABLE 3-1-continued

| | | | | | | | | |
|---|---|---|---|---|---|---|---|---|
| Drawing conditions | Draw ratio(%) (MD direction/TD direction) | 62/120 | 42/160 | 49/190 | 64/120 | 50/50 | 50/50 | 50/50 |
| | Drawing temperature(° C.) | 137/135 | 130/128 | 133/132 | 137/135 | 135/131 | 122/120 | 137/135 |
| Film characteristics | Thickness(μm) | 94 | 85 | 87 | 95 | 100 | 80 | 99 |
| | Birefringence(nx − ny)(×10$^{-3}$) | 1.9 | 1.9 | 3.3 | 1.8 | 0.4 | 0.1 | 0.3 |
| | Re(nm) | 176 | 159 | 289 | 175 | 37 | 5 | 30 |
| | Rth(nm) | −288 | −173 | −265 | −288 | | | |
| | |Re/Rth| | 0.61 | 0.91 | 1.1 | 0.61 | | | |
| | Nz | −1.1 | −0.58 | −0.42 | −1.1 | | | |
| | Spectral transmittance 380 nm(% T) | 88 | 1.6 | 1.6 | 1.6 | 87 | 92 | 92 |
| | Photoelastic coefficient (×10$^{-12}$ Pa$^{-1}$) | 2.1 | −0.7 | 1.2 | 3.3 | 4.8 | −4.2 | 4.1 |
| | All-wavelength light transmittance(%) | 90 or more | 90 or more | 90 or more | 90 or more | 90 or more | 90 or more | 90 or more |

TABLE 3-2

| | | | Example | | | | | | | | | |
|---|---|---|---|---|---|---|---|---|---|---|---|---|
| | | | 47 | 48 | 49 | 50 | 51 | 52 | 53 | 54 | 55 | 56 |
| Composition (parts by mass) | Resin(a) | (a-1) | 50 | 20 | 20 | — | — | — | — | — | — | — |
| | | (a-2-2) | — | — | — | 75 | 75 | — | — | — | — | — |
| | | (a-2-3) | — | — | — | — | — | 25 | 50 | 75 | — | — |
| | | (a-3-2) | — | — | — | — | — | — | — | — | 60 | 60 |
| | Resin(b) | (b-1) | — | — | — | 25 | 25 | 75 | 50 | 25 | — | — |
| | | (b-2) | — | — | — | — | — | — | — | — | 40 | 40 |
| | | (b-3) | 50 | 80 | 80 | — | — | — | — | — | — | — |
| | Ultraviolet absorbent | (c-1) | — | — | — | — | — | — | — | — | — | — |
| Molding conditions | Resin temperature in cylinder of extruder(° C.) | | 240 | 240 | 240 | 241 | 241 | 245 | 245 | 245 | 230 | 230 |
| | Extruder T-die temperature(° C.) | | 250 | 250 | 250 | 250 | 250 | 260 | 260 | 260 | 250 | 250 |
| Drawing conditions | Draw-ratio(%) (MD direction/TD direction) | | 100/100 | 80/75 | 100/70 | 100/100 | 100/50 | 100/50 | 100/0 | 100/50 | 100/0 | 50/0 |
| | Drawing temperature(° C.) | | 136/136 | 137/137 | 137/137 | 143/143 | 143/143 | 132/132 | 143/— | 143/144 | 140/— | 140/— |
| Film characteristics | Thickness(μm) | | 62 | 88 | 89 | 69 | 86 | 77 | 80 | 86 | 58 | 74 |
| | Birefringence(nx − ny)(×10$^{-3}$) | | 1.0 | 0.7 | 0.5 | 2.9 | 4.5 | 1.7 | 2.7 | 4.5 | 6.5 | 3.2 |
| | Re(nm) | | 63.4 | 63.6 | 45 | 202 | 383 | 143.9 | 216 | 383 | 376 | 240 |
| | Rth(nm) | | −226 | −145 | −145 | −383 | −438 | −199 | −183 | −438 | −199 | −127 |
| | |Re/Rth| | | 0.28 | 0.44 | 0.31 | 0.53 | 0.87 | 0.72 | 1.18 | 0.88 | 1.89 | 1.88 |
| | Nz | | −3.1 | −1.8 | −2.7 | −1.4 | −0.6 | −0.9 | 0.0 | −0.6 | −0.03 | −0.03 |
| | Spectral transmittance 380 nm(% T) | | 88 | 88 | 88 | 88 | 88 | 88 | 88 | 88 | 88 | 88 |
| | Photoelastic coefficient(×10$^{-12}$ Pa$^{-1}$) | | 1.3 | −0.8 | −0.9 | −2.6 | −2.4 | −1.3 | 0.4 | 2.3 | −0.6 | −0.5 |
| | All-wavelength light transmittance (%) | | 90 or more | 90 or more | 90 or more | 90 or more | 90 or more | 90 or more | 90 or more | 90 or more | 90 or more | 90 or more |

Examples 26 to 30

Resin compositions having compositions described in Table 4 were extruded to obtain undrawn films by using an extruder (BT-30-C-36-L type/provided with a T-die having a width of 400 mm/a lip with a thickness of 0.8 mm) provided with the T-die and manufactured by PLABOR Co. Ltd., while adjusting a screw rotation number, a resin temperature in the cylinder of the extruder, and a temperature of the T-die.

Subsequently, films with a width of ½ of a distance between chucks cut out from the resultant undrawn film were uniaxially drawn in a direction (a TD direction) perpendicular to a film flow direction (an extruding direction) by use of a tenter drawing machine manufactured by Ichikin Kogyo K.K. Drawings were carried out at a flow speed of 2 m/minute while adjusting a distance between tenter chucks so as to obtain a targeted draw ratio.

The composition, extrusion molding conditions, drawing conditions, and film characteristics of each uniaxially drawn film are shown in Table 4.

Each of the uniaxially drawn films of Examples 26 to 30 had a small absolute value of a photoelastic coefficient and a Nz value close to zero.

Additionally, it could be confirmed from the results of Examples 27 to 30 that the value of the photoelastic coefficient of the film increased as an amount of a resin (a) blended in the resin composition constituting the film increased. Consequently, it could be confirmed that in the present invention, the photoelastic coefficient of the resin composition can be controlled by adjusting the blending amounts of the resins (a) and (b).

TABLE 4

| | | | Example 26 | Example 27 | Example 28 | Example 29 | Example 30 |
|---|---|---|---|---|---|---|---|
| Composition (parts by mass) | Resin(a) | Styrene-methacrylic acid copoymer (a-2-1) | 75 | — | — | — | — |

TABLE 4-continued

|  |  |  | Example 26 | Example 27 | Example 28 | Example 29 | Example 30 |
|---|---|---|---|---|---|---|---|
|  |  | Styrene-maleic anhydride copolymer (a-3-1) | — | 30 | 40 | 50 | 70 |
|  | Resin(b) | Methyl methacrylate-methyl acrylate copolymer (b-2) | 25 | 70 | 60 | 50 | 30 |
| Molding conditions | Resin temperature in cylinder of extruder(° C.) | | 253 | 255 | 255 | 255 | 255 |
| Molding conditions | Extruder T-die temperature(° C.) | | 255 | 255 | 255 | 255 | 255 |
| Molding conditions | Draw ratio(%) (MD direction/TD direction) | | 90 | 80 | 110 | 80 | 80 |
|  | Drawing temperature(° C.) | | 128 | 130 | 131 | 133 | 137 |
| Film characteristics | Thickness(μm) | | 96 | 105 | 80 | 99 | 108 |
| Film characteristics | Re(nm) | | 285 | 142 | 135 | 257 | 259 |
|  | Rth(nm) | | −148 | −72 | −69.6 | −133 | −134 |
|  | |Re/Rth| | | 1.93 | 1.97 | 1.90 | 1.93 | 1.93 |
|  | Nz | | −0.02 | −0.01 | −0.02 | −0.02 | −0.02 |
|  | Spectral transmittance 380 nm(% T) | | 88 | 88 | 88 | 88 | 88 |
|  | Photoelastic coefficient(×$10^{-12}$ $Pa^{-1}$) | | −3.0 | −1.9 | −1 | −0.1 | 2.1 |

Examples 31 to 41, Comparative Example 16

Manufacturing of Protective Films of Examples 31 to 34, Test Examples 1 to 4

Undrawn films were obtained by using the resin compositions shown in Table 5 and extruding them using an extruder equipped with a T-die ("KZW15TW-25MG-NH, equipped with a T die having a width of 150 mm, lip thickness: 0.5 mm) manufactured by Technovel Corporation while adjusting a resin temperature in the cylinder of the extruder and a T die temperature to those as shown in the conditions shown in Table 5. The machine direction of the film (extruding direction) is defined as MD direction, while a direction vertical to the MD direction is defined as a TD direction.

The undrawn films were cut into a width of 50 mm and uniaxially drawn under the conditions as shown in Table 5 (length between chucks: 30 mm, chuck movement speed: 500 mm/min) by using a tensile tester to yield uniaxially drawn films.

The uniaxially drawn films were then cut into a width of 50 mm and uniaxially drawn under the conditions as shown in Table 5 (length between chucks: 50 mm, chuck movement speed: 500 mm/min) by using a tensile tester to yield the biaxially drawn films of Examples 31 to 34, and Trial Examples 1 to 4.

Extrusion and drawing conditions, film thickness, and Re are shown in Table 5.

TABLE 5

|  |  |  | Example 31 | Example 32 | Example 33 | Example 34 | Test Example 1 |
|---|---|---|---|---|---|---|---|
| Composition (parts by mass) | Resin(a) | Styrene-methacrylic copolymer (a-2-1) | 60 | 60 | 80 | — | — |
|  |  | Styrene-maleic anhydride copolymer (a-3-1) | — | — | — | 60 | — |
|  | Resin(b) | Methyl methacrylate-methyl acrylate copolymer (b-1) | 40 | 40 | 20 | 40 | — |
|  | Resin(d) | Methyl methacrylate-methyl acrylate copolymer (d-1) | — | — | — | — | 90 |
|  |  | Methyl methacrylate-maleic anhydride-styrene copolymer (d-2) | — | — | — | — | — |
|  |  | Methyl methacrylate-6-membered-ring-containing unit-styrene copolymer (d-3) | — | — | — | — | — |
|  | Resin(e) | Polylactic acid(e-1) | — | — | — | — | 10 |
| Molding conditions | Resin temperature in cylinder of extruder(° C.) | | 255 | 255 | 255 | 255 | 235 |
| Molding conditions | Extruder T-die temperature(° C.) | | 255 | 255 | 255 | 255 | 235 |
| Molding conditions | Draw-ratio(%) (MD direction/TD direction) | | 70/100 | 70/170 | 70/100 | 70/100 | 50/50 |
|  | Drawing temperature(° C.) | | 130/130 | 130/130 | 130/130 | 130/130 | 120/120 |
| Film characteristics | Thickness(μm) | | 100 | 75 | 100 | 77 | 90 |
| Film characteristics | Re(nm) | | 140 | 275 | 211 | 280 | 3 |

|  |  |  | Test Example 2 | Test Example 3 | Test Example 4 | TAC-1 | COP-1 |
|---|---|---|---|---|---|---|---|
| Composition (parts by mass) | Resin(a) | Styrene-methacrylic copolymer (a-2-1) | — | — | — | Triacetyl cellulose protective film | Cycloolefin resin protective film |
|  |  | Styrene-maleic anhydride copolymer (a-3-1) | — | — | — | | |

TABLE 5-continued

|  |  |  |  |  |  |  |
|---|---|---|---|---|---|---|
| | Resin(b) | Methyl methacrylate-methyl acrylate copolymer (b-1) | — | — | — | | |
| | Resin(d) | Methyl methacrylate-methyl acrylate copolymer (d-1) | 90 | — | — | | |
| | | Methyl methacrylate-maleic anhydride-styrene copolymer (d-2) | — | 100 | — | | |
| | | Methyl methacrylate-6-membered-ring-containing unit-styrene copolymer (d-3) | — | — | 100 | | |
| | Resin(e) | Polylactic acid(e-1) | 10 | — | — | | |
| Molding conditions | Resin temperature in cylinder of extruder(° C.) | | 235 | 260 | 250 | | |
| | Extruder T-die temperature(° C.) | | 235 | 255 | 250 | | |
| Molding conditions | Draw-ratio(%) (MD direction/TD direction) | | 100/100 | 100/100 | 70/50 | | |
| | Drawing temperature(° C.) | | 120/120 | 140/140 | 150/150 | | |
| Film characteristics | Thickness(μm) | | 44 | 45 | 85 | 80 | 80 |
| | Re(nm) | | 1 | 4 | 3 | 5 | 6 |

(Manufacturing of Triacetyl Cellulose Protective Film (TAC-1))

A triacetyl cellulose film was manufactured as a typical example of a conventional polarizer protective film as follows.

First, 21 parts by mass of triacetyl cellulose, 2 parts by mass of triphenyl phosphate (a plasticizer) and 1 part by mass of biphenyl diphenyl phosphate (a plasticizer) were dissolved in 62 parts by mass of methylene chloride, 12 parts by mass of methanol and 2 parts by mass of n-butanol, to prepare a dope. The dope was allowed to flow along an endless metal support to form a film on the support. The film on the support was dried until an amount of an organic solvent in the film became 60% by mass, and the film was stripped from the support.

A dimension of the film in a lateral direction was fixed using a tenter, and the film in this state was dried from both surfaces for three minutes until the amount of organic solvent in the film became 15% by mass (primary drying). An elongation of a dimension of the film in a vertical direction was 4.5% from a time when the film was stripped from the support to a time when the primary drying of the film ended. Furthermore, the film was dried using a roller until the amount of the organic solvent in the film became 0.5% by mass (secondary drying). The resultant film was wound up, and finally the surface of the film was subjected to a saponifying treatment to prepare a triacetyl cellulose film having a thickness of 80 μm. An in-plane retardation of this film was 5 nm.

(Manufacturing of Cycloolefin Protective Film (COP-1))

A film formed of a cycloolefin resin, an amorphous polyolefin resin, was manufactured as a typical conventional polarizer protective film, as follows.

As a cyclic polyolefin, ethylene and norbornene were subjected to additional polymerization to manufacture an ethylene-norbornene random copolymer (an ethylene content: 65 mol %, MFR: 31 g/10 minutes, a number-average molecular weight: 68000). 100 parts by mass of the resultant resin were dissolved in a mixed solvent comprising 80 parts by mass of cyclohexane, 80 parts by mass of toluene and 80 parts by mass of xylene, and a film having a thickness of 80 μm was prepared by a flow casting process. This film had an in-plane retardation of 6 nm.

(Manufacturing of Polarization Film)

Polyvinyl acetate was saponified (a saponification degree of 98 mol %), and then molded, and the resultant polyvinyl alcohol film (a thickness of 75 μm) was immersed in an aqueous solution comprising 1000 parts by mass of water, 7 parts by mass of iodine and 105 parts by mass of potassium iodide to adsorb iodine in the film. Subsequently, this film was uniaxially fivefold drawn in a vertical direction in 4% by mass of aqueous boric acid solution at 40° C., and then dried while being stretched to obtain a polarization film.

(Manufacturing of Polarizers of Examples 35 to 41 and 57 to 61, Comparative Example 16)

By use of a 10% aqueous solution of a polyvinyl alcohol resin as an adhesive, protective films of Examples 31 to 34 and Test Examples 1 to 4 were laminated on both surfaces of a polarization film in combinations as shown in Table 6, to obtain polarizers.

Warpages and polarization degree retention ratios of the polarizers of Examples 35 to 41 and 57 to 61, and Comparative Example 16, are shown in Table 6.

It could be confirmed from Table 6 that the polarizer using a molded article of the present invention with respect to the protective film, had little warpage and excellent durability against heat and humidity.

TABLE 6

| | Example 35 | Example 36 | Example 37 | Example 38 | Example 39 | Example 40 | Example 41 |
|---|---|---|---|---|---|---|---|
| Protective film of first surface | Test Example 1 | Test Example 2 | Test Example 3 | Test Example 1 | Test Example 2 | Test Example 3 | Test Example 3 |
| Protective film of second surface | Example 31 | Example 31 | Example 31 | Example 32 | Example 33 | Example 32 | Example 34 |
| Warpage of polarizer(mm) | 1 | 1 | 1 | 1 | 2 | 0 | 0 |
| Polarization degree retention ratio(%) | 100 | 100 | 100 | 100 | 100 | 100 | 100 |

| | Comparative Example 16 | Example 57 | Example 58 | Example 59 | Example 60 | Example 61 |
|---|---|---|---|---|---|---|
| Protective film of first surface | TAC-1 | Test Example 4 | Test Example 4 | Test Example 4 | Test Example 4 | Test Example 3 |
| Protective film of second surface | COP-1 | Example 31 | Example 32 | Example 33 | Example 34 | Example 33 |

TABLE 6-continued

| | | | | | | |
|---|---|---|---|---|---|---|
| Warpage of polarizer(mm) | 21 | 0 | 0 | 0 | 0 | 0 |
| Polarization degree retention ratio(%) | 65 | 100 | 100 | 100 | 100 | 100 |

INDUSTRIAL APPLICABILITY

A resin composition for an optical material of the present invention can be used in an optical material for manufacturing various optical elements such as a display front plate, a display board, a touch panel, a transparent board for use in a solar cell and the like, and a wave director, a lens, an optical fiber, a material for covering the optical fiber, an LED lens, a lens cover and the like, in fields of an optical communication system, an optical replacement system, an optical measurement system, and the like.

In particular, the resin composition for the optical material of the present invention can preferably be used as an optical material for manufacturing a polarizer protective film for use in an optical element required to have a high birefringence and a low photoelastic coefficient, for example, a liquid crystal display, a plasma display, an organic EL display, a field emission display, a rear protection television display or the like; a phase difference plate such as a ¼ wavelength plate or a ½ wavelength plate; and a liquid crystal optical compensation film such as a view field angle control film.

Above all, the resin composition for the optical material of the present invention can preferably be used in the optical material for manufacturing an IPS mode liquid crystal display device retarder film required to have a retardation with negative value in the thickness-direction.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An optical compensation film comprising a resin composition, wherein the resin composition comprises:
    a styrene resin (a) having a positive photoelastic coefficient at 23° C. and a negative inherent birefringence, the styrene resin being selected from the group consisting of a styrene-acrylonitrile copolymer having a content of acrylonitrile of from 1 to 40% by mass, a styrene-methacrylic acid copolymer having a content of methacrylic acid of from 0.1 to 50% by mass, and a styrene maleic anhydride copolymer having a content of maleic anhydride of from 0.1 to 50% by mass; and
    an acrylic resin (b) having a negative photoelastic coefficient at 23° C. and a negative inherent birefringence, the acrylic resin (b) being formed from a monomer starting material containing 50 to 100% by mass of an alkyl ester of acrylic acid or an alkyl ester of methacrylic acid.

2. The optical compensation film according to claim 1, wherein an absolute value of a photoelastic coefficient at 23° C. is within a range of 0 to $4 \times 10^{-12}$ $Pa^{-1}$.

3. The optical compensation film according to claim 1, wherein an absolute value of a photoelastic coefficient at 23° C. is 0 to $4 \times 10^{-12}$ $Pa^{-1}$, and a spectral transmittance in 380 nm is 5% or less.

4. The optical compensation film according to claim 1, which is a film molded by extrusion molding.

5. The optical compensation film according to claim 1, which is a film molded by cast molding.

6. The optical compensation film according to claim 1, wherein the value of a retardation in a thickness direction (Rth) is −300 to −1 nm.

7. The optical compensation film according to claim 1, wherein the absolute value of the ratio (Re/Rth) between an in-plane retardation (Re) and a retardation in a thickness direction (Rth) is 3 or less.

8. The optical compensation film according to claim 1, wherein the $N_Z$ coefficient is −5 to 0.

9. A polarizer protective film comprising the optical compensation film according to claim 1.

10. A polarizer having the polarizer protective film according to claim 9 with a Re of 10 nm or more laminated on one surface of a polarizing film, and a protective film made of an acrylic resin and with a Re of 10 nm or less laminated on the other surface of the polarization film.

11. The optical compensation film according to claim 1, wherein a thickness of the optical compensation film is one micrometer or more but less than 300 μm.

12. The optical compensation film according to claim 1, wherein a total of the contents of the resins (a) and (b) based on the resin composition is 70% by mass or more, and a mass ratio ((a)/(b)) of the content of the resin (a) to the content of the resin (b) is from 0.1/99.9 to 99.9/0.1.

13. The optical compensation film according to claim 1, comprising 0.1 to 10 parts by mass of an ultraviolet absorbent (c) to 100 parts by mass of the resin composition consisting of 1 to 99 parts by mass of the resin (a) and 1 to 99 parts by mass of the resin (b).

14. The optical compensation film according to claim 1, wherein the acrylic resin (b) is a homopolymer of methyl methacrylate, or a copolymer of methyl methacrylate and another monomer which is at least one or more selected from the group consisting of alkyl esters of methacrylic acid other than methyl methacrylate, alkyl esters of acrylic acid, aromatic vinyl compounds, vinyl cyanides, maleimides, unsaturated carboxylic anhydrides, and unsaturated acids.

15. The optical compensation film according to claim 1, wherein
    the acrylic resin (b) is a copolymer, and
    the copolymer is formed from a monomer combination containing 0.1 to 15% by mass of the alkyl ester of acrylic acid.

16. The optical compensation film according to claim 1, wherein a weight-average molecular weight of the acrylic resin (b) is from 50,000 to 200,000.

17. The optical compensation film according to claim 1, wherein the acrylic resin (b) is obtainable by a bulk polymerization or a solution polymerization.

* * * * *